US008849914B2

(12) United States Patent
Bove et al.

(10) Patent No.: US 8,849,914 B2
(45) Date of Patent: Sep. 30, 2014

(54) SYSTEM AND METHOD FOR SYNCHRONIZED CO-BROWSING BY USERS IN DIFFERENT WEB SESSIONS

(75) Inventors: Louis Peter Bove, Pottstown, PA (US); Joseph F. Ceklosky, Jr., Pottstown, PA (US); Glenn Jackson Hubler, Eaglesville, PA (US)

(73) Assignee: The Vanguard Group, Inc., Valley Forge, PA (US)

( * ) Notice: Subject to any disclaimer, the term of this patent is extended or adjusted under 35 U.S.C. 154(b) by 1253 days.

(21) Appl. No.: 11/961,735

(22) Filed: Dec. 20, 2007

(65) Prior Publication Data

US 2009/0164581 A1   Jun. 25, 2009

(51) Int. Cl.
G06F 15/16 (2006.01)
G06F 17/30 (2006.01)

(52) U.S. Cl.
CPC ............................... *G06F 17/30873* (2013.01)
USPC ............ 709/205; 709/202; 709/217; 709/227

(58) Field of Classification Search
None
See application file for complete search history.

(56) References Cited

U.S. PATENT DOCUMENTS

| | | |
|---|---|---|
| 5,862,330 A | 1/1999 | Anupam et al. |
| 5,974,135 A | 10/1999 | Breneman et al. |
| 5,991,796 A | 11/1999 | Anupam et al. |
| 6,070,185 A | 5/2000 | Anupam et al. |
| 6,151,020 A | 11/2000 | Palmer et al. |
| 6,192,394 B1 | 2/2001 | Gutfreund et al. |
| 6,196,846 B1 | 3/2001 | Berger et al. |
| 6,230,171 B1 | 5/2001 | Pacifici et al. |
| 6,253,228 B1 | 6/2001 | Ferris et al. |
| 6,295,551 B1 | 9/2001 | Roberts et al. |

(Continued)

OTHER PUBLICATIONS

Esenther, Alan W., "Instant Co-Browsing: Lightweight Real-Time Collaborative Web Browsing," Conference Proceedings of the Eleventh International World Wide Web Conference (WWW2002), May 2002, 11 pp., Honolulu, HI.

(Continued)

*Primary Examiner* — Patrice Winder
*Assistant Examiner* — Nam Tran
(74) *Attorney, Agent, or Firm* — RatnerPrestia

(57) ABSTRACT

A system and method for enabling co-browsing between two or more users accessing a website in separate sessions. Each of the users operates a web browser instance to browse the website. The website comprises one or more web pages, at least a portion of which includes embedded software code or script. A collaboration manager, established after the users consent to co-browsing, associates the sessions of the users. As the users navigate to new web addresses in the website or enter data into their browser instances, the software code or script embedded within the web pages rendered in the browser instances causes each user's browser to communicate changes in the web addresses or data to the collaboration manager. The collaboration manager receives the communicated changes and provides them to other co-browsing users. Synchronization of cursors, scroll-bar positions and other browser events is also supported.

37 Claims, 12 Drawing Sheets

(56) References Cited

U.S. PATENT DOCUMENTS

| | | | |
|---|---|---|---|
| 6,360,250 B1 | 3/2002 | Anupam et al. | |
| 6,411,989 B1 | 6/2002 | Anupam et al. | |
| 6,430,567 B2 | 8/2002 | Burridge | |
| 6,487,195 B1 | 11/2002 | Choung et al. | |
| 6,668,273 B1 | 12/2003 | Rust | |
| 6,675,216 B1 | 1/2004 | Quatrano et al. | |
| 6,732,145 B1 | 5/2004 | Aravamudan et al. | |
| 6,748,420 B1 | 6/2004 | Quatrano et al. | |
| 6,754,693 B1 | 6/2004 | Roberts et al. | |
| 6,871,213 B1 | 3/2005 | Graham et al. | |
| 6,950,852 B1 | 9/2005 | Kobayaghi et al. | |
| 7,003,550 B1 | 2/2006 | Cleasby et al. | |
| 7,043,529 B1 | 5/2006 | Simonoff | |
| 7,051,068 B1 | 5/2006 | Kawase et al. | |
| 7,062,465 B1 | 6/2006 | Shafiee et al. | |
| 7,127,495 B2 | 10/2006 | Brown et al. | |
| 7,130,885 B2 | 10/2006 | Chandra et al. | |
| 7,149,776 B1 * | 12/2006 | Roy et al. | 709/205 |
| 7,174,505 B2 | 2/2007 | Nakagawa et al. | |
| 2001/0054064 A1 | 12/2001 | Kannan | |
| 2002/0016788 A1 | 2/2002 | Burridge | |
| 2002/0038388 A1 | 3/2002 | Netter | |
| 2002/0065912 A1 | 5/2002 | Catchpole et al. | |
| 2002/0138624 A1 | 9/2002 | Esenther | |
| 2003/0105819 A1 | 6/2003 | Kim et al. | |
| 2003/0225836 A1 | 12/2003 | Lee et al. | |
| 2004/0083113 A1 | 4/2004 | Cao et al. | |
| 2004/0133639 A1 | 7/2004 | Shuang et al. | |
| 2005/0138122 A1 * | 6/2005 | Boehringer et al. | 709/205 |
| 2006/0031077 A1 | 2/2006 | Dalton et al. | |
| 2006/0259553 A1 * | 11/2006 | Kawakita | 709/205 |

OTHER PUBLICATIONS

Esenther, Alan W., "Instant Co-Browsing: Lightweight Real-time Collaborative Web Browsing," Conference Proceedings of the Eleventh International World Wide Web Conference (WWW2002), May 2002, 4 pp., Honolulu, HI.

International Search Report for International Application No. PCT/US 08/87331; Completed May 26, 2009; Mailed Jun. 8, 2009.

Written Opinion of the International Searching Authority for International Application No. PCT/US 08/87331; Completed May 28, 2009; Mailed Jun. 8, 2009.

Esenther, Alan W., Instant Co-Browsing: Lightweight Real-Time Collaborative Web Browsing (11pp.) (publication date unknown).

Esenther, Alan W., Instant Co-Browsing: Lightweight Real-time Collaborative Web Browsing (4 pp.) (publication date unknown).

Jacobs, S., et al., Filling HTML Forms Simultaneously: CoWeb Architecture and Functionality, *Computer Networks and ISDN Systems*, May 1996, n.28, p. 1385-1395.

Kobayashi, M., et al., Collaborative Customer Services Using Synchronous Web Browser Sharing, *Proceedings of the 1998 ACM Conference on Computer Supported Cooperative Work*, Nov. 14-18, 1998, p. 99-108, ACM Press, New York, NY, U.S.

Puglia, S., et al., MultiECommerce: A Distributed Architecture for Collaborative Shopping on the WWW, *Proceedings of the 2nd ACM Conference on Electronic Commerce*, Oct. 17-20, 2000, p. 215-224, ACM Press, New York, NY, U.S.

* cited by examiner

SYSTEM AND METHOD FOR SYNCHRONIZED CO-BROWSING BY USERS IN DIFFERENT WEB SESSIONS

FIELD

The present invention relates to computer applications and systems for enabling co-browsing between two or more users on a computer network, such as may be beneficial for use in customer service applications involving the World Wide Web.

BACKGROUND

Co-browsing (also referred to herein as "collaboration") among two or more users in an Internet or World Wide Web environment using proxy servers or shared web pages is known in the art. FIG. 1 illustrates an embodiment of a prior-art co-browsing system 100 that facilitates co-browsing between a customer service representative ("CSR") of a corporation and a customer of the corporation. The customer, using browser 110, and the CSR, using CSR browser 120, co-browse to a proxy server 130, which then in turn browses a website 140 served by a web server (not illustrated). The co-browsing users (the customer and the CSR) do not co-browse the actual website 140 but instead co-browse to proxy server 130.

Proxy server 130 receives browser messages from either customer browser 110 or CSR browser 120, passes them through to the web server serving website 140, intercepts results originating from the web server, and passes the results (possibly after modification) to each of browsers 110 and 120. The use of a co-browsed proxy server 130 allows vendors to introduce code on proxy server 130 that allows messages and hypertext markup language ("HTML") pages to be sent back and forth between browsers 110 and 120. Proxy server 130 may also add proprietary code, such as Java applets or plug-ins (such as Flash), to each of browsers 110 and 120.

In some customer service environments, such as in a financial services environment, it may be beneficial for the CSR to have information available to him or her that is different from information that is made available to the customer. Additionally, certain environments may provide different types of information to different CSRs depending upon the level or training of the CSR. Co-browsing systems, such as system 100, that make use of proxy servers are not sufficient to meet the above-noted needs.

SUMMARY

One aspect of the present invention comprises a method for collaborative internet browsing by a first user associated with a first computer and a second user associated with a second computer. The first computer comprises a first display and a first browser that comprises a first open browser instance. The second computer comprises a second display and a second browser that comprises a second open browser instance. The method comprises the steps of providing a website accessible by the first and second browsers, establishing a first connection between the first computer and the website and establishing a second connection between the second computer and the website. The website comprises one or more web pages, each of which is associated with a web address.

The method further comprises displaying, in the first browser instance of the first computer, a first web page corresponding to a first web address and establishing a collaboration manager (i) that, without requiring installation or downloading of any collaboration-enabling executable software program by either computer or requiring the use of an additional browser instance or frame to transmit or receive changes in the first or second browser instances, associates the first and second browser instances and (ii) that communicates changes or events originating in the first browser instance to the second browser instance. The method further comprises causing the first browser instance to notify the collaboration manager of changes or events originating in the first browser instance, to communicate with the collaboration manager in order to retrieve changes or events originating in the second browser instance, and to synchronize the first browser instance to mirror the changes or events originating in the second browser instance, and causing the second browser instance to notify the collaboration manager of changes or events originating in the second browser instance, to communicate with the collaboration manager in order to retrieve changes or events originating in the first browser instance, and to synchronize the second browser instance to mirror the changes or events originating in the first browser instance.

In another aspect of the invention, the first and second users login to the website by providing personal identifications ("ID" in singular and "IDs" in plural). The first user's connection to the website is assigned a first session, which comprises a first session ID and the first user's personal ID. The second user's connection to the website is assigned a second session, which comprises a second session ID and the second user's personal ID. The establishment of the collaboration manager that associates the first and second browser instances results in the generation of a co-browse ID that is also stored within the first and second sessions.

The collaboration manager also maintains one or more tables of browser changes or events received from the first and second browser instances. In an exemplary embodiment, the collaboration manager comprises a first table that corresponds to the first user's session and a second table that corresponds to the second user's session, and the tables are identified by the co-browse ID for the users' collaboration session.

Given a session ID corresponding to the first user, the collaboration manager is able to discern the co-browse ID corresponding to the first and second users. The collaboration manager is therefore able keep track of the browser instances of the first and second users to notify them of changes originating in co-browsing users' sessions. More specifically, using the tables, the collaboration manager notifies the first and second browser instances of browser changes or events so that the first and second browser instances are able to synchronize. The tables may reflect URLs accessed by the first and second browser instances, data changes in the first and second browser instances, and mouse cursor and scroll-bar positions in the first and second browser instances.

In a further aspect of the invention, changes in a web browser trigger browser events. Each web page in the website includes embedded software code or script that identifies or captures such events and causes the browser instance which is rendering such web page to notify the collaboration manager of the browser changes corresponding to these browser events. Such events are triggered by changes in uniform resource locators (URLs) or web addresses accessed by the first and second browser instances, changes in data displayed in the first and second browser instances, and mouse-cursor movements. The embedded software code or script also causes the first and second browser instances to request notification of browser changes originating in co-browsing browser instances on a periodic basis.

In a still further aspect of the invention, a website comprises at least two sets of web pages. A first set is accessible to the first user, and a second set is accessible to the second user. One or more pages in the second set of web pages comprise at least a portion thereof that is identical in content to at least a portion of a corresponding page or pages in the first set of web pages. Thus, using the method disclosed herein, the one or more pages in the second set of web pages may be partially synchronized to their corresponding pages in the first set of web pages.

In an exemplary embodiment, one or more pages in the second set of web pages (i) comprise additional or different content not provided in a corresponding page or pages in the first set of web pages or (ii) do not correspond to a page or pages in the first set of web pages. Such may be the case when, for example, the second user has sufficient privileges to view content not accessible to the first user. In the case that the first user is a customer and the second user is a customer service representative, such one or more pages in the second set not wholly accessible to the first user may contain additional or confidential information on that customer's accounts. It is desirable for the customer not to be able to access such information.

Another aspect of the present invention comprises a method for synchronizing uniform resource locators (herein "URL" in singular and "URLs" in plural) accessed by a first user associated with a first computer and a second user associated with a second computer. The first computer comprises a first display and a first computer-executable software program stored on a tangible computer readable medium. The second computer comprises a second display and a second computer-executable second software program stored on a tangible computer readable medium. The method comprises establishing a first connection between the first computer and a computer network, the computer network comprising a plurality of URLs accessible by connected users, each URL being associated with one or more resources and establishing a second connection between the second computer and the computer network. The method further comprises receiving from the first computer a first request comprising a request to access a first URL and providing resources specified by the first URL to the first computer. As a result of the first computer receiving the resources specified by the first URL, the first computer is caused to provide a notification of receipt of the resources. The notification of the receipt of the resources by the first computer is received and, as a result of receiving the notification from the first computer, resources specified by the first URL are provided to the second computer.

Yet another aspect of the present invention comprises a method for synchronizing data displayed on a first computer and on a second computer. The first computer comprises a first display and a first computer-executable software program stored on a tangible computer readable medium. The second computer comprises a second display and a second computer-executable software program stored on a tangible computer readable medium. The method comprises establishing a first connection between the first computer and a computer network, the computer network comprising a plurality of web pages accessible by connected users and establishing a second connection between the second computer and a second computer network. The method further comprises receiving from the first computer a first request comprising a request to access a web page and providing the web page to the first computer, the web page comprising embedded software code that causes the first computer to provide a notification of a data change in the web page. Notification of the data change in the web page provided to the first computer is received, and notification of the data change is provided to the second computer.

BRIEF DESCRIPTION OF THE DRAWINGS

The invention is best understood from the following detailed description when read in connection with the accompanying drawings. Included in the drawings are the following figures.

DETAILED DESCRIPTION

Figure 1:
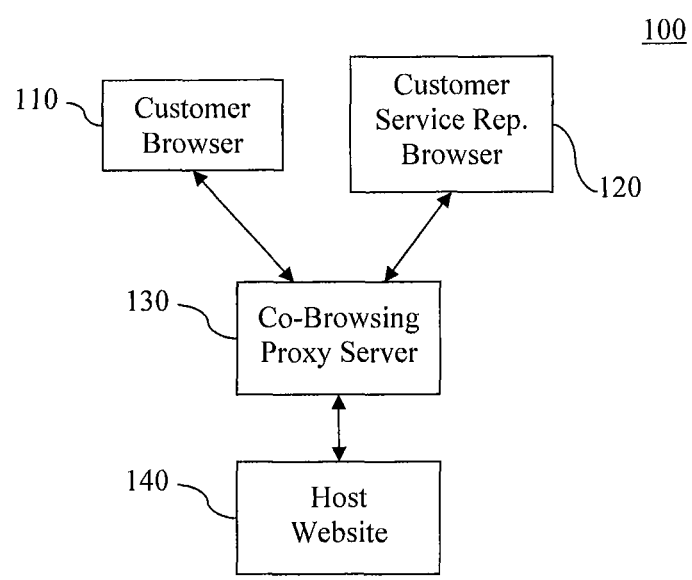
FIG. 1 is an illustration of a prior-art co-browsing system.

As understood in the art, a website is a collection of web pages served on a particular domain or subdomain on the World Wide Web. Each web page is generally associated with a uniform resource locator ("URL") which identifies the resources associated with the web page, such as Hyper Text Markup Language ("HTML") code that, at least in part, specifies the visual layout and the content of the web page to be rendered in a user's browser. The website, or, more generally, the resources associated with a URL, may be served by one or more servers to connected users who submit requests to view particular web pages or resources associated with particular URLs. Such servers may serve the website or URL-associated resources in separate sessions so that different users may concurrently view different pages of the website or may access different URLs at the same time.

URL synchronization is the process by which one or more servers provide co-browsing users access to identical, nearly identical, or related URLs. Web-page synchronization may be viewed as a subset of URL synchronization. Thus, web-page synchronization is the process by which one or more servers provide co-browsing users access to similar, identical, or related portions of a website, e.g., access to similar, identical, or related web pages.

A web page may receive or display dynamic content, as broadly understood, generated or specified either by a user browsing the web page or a server serving the web page. An example of user-specified dynamic content is alphanumeric text entered by the user into a text box rendered within the web page currently being viewed by the user. An example of server-generated dynamic content is a news feed. Dynamic web content gives rise to a particular issue in co-browsing: that of assuring that co-browsing users accessing identical, nearly identical, or related URLs have access to identical, nearly identical, or related resources, content, or data.

In systems not configured for co-browsing, alphanumeric text entered into a web page, such as into a text box on the web page, is not necessarily communicated back to the web server serving the web page. For example, the user's computer may have an applet installed which uses alphanumeric text entered by the user in a web page. In such a scenario, there is no need to communicate this text back to the web server. In other cases in which the user's browser does communicate the entered alphanumeric text back to the web server, as in the case of online ordering, the text is not accessible by other sessions on the web server. In both of the above-noted scenarios, because the alphanumeric text entered by the user is not part of the HTML or other content served by the web server, in systems not configured for co-browsing, the server will not serve the user-entered data to any other users accessing otherwise identical or related content in different sessions. Data synchronization is the process by which one or more servers provide co-browsing users with access to identical, nearly identical, or related content, including dynamic content, associated with identical, nearly identical, or related URLs or areas of a website.

As users co-browse, it may be desirable for a first user to know the position of another co-browsing user's (a second user's) mouse's cursor. Such may be the case when, for example, the second user would like to point to a feature on a web page and have the first user see which feature is indicated. A subset of data synchronization is the process by which a representation of the second user's mouse's cursor is rendered in the browser operated by the first user. Thus, as the second user moves his mouse's cursor within his own browser (the second user's browser), the first user is able to see, within his own browser (the first user's browser), an avatar that indicates the location of the second user's mouse's cursor.

Further, web pages are commonly larger than the windows of the browsers on which they are rendered. Thus, as a user browses a particular web page, he may be required to scroll the window of his browser to view different portions of the web page. Another subset of data synchronization is the process by which the scroll-bar positions of a window in a first user's browser's window are communicated to a co-browsing second user's browser. Thus, as the first user scrolls a window of his browser, a window in the second user's browser scrolls accordingly.

The URL synchronization and data synchronization described above and in further detail below are examples of synchronization of browser changes and/or events. It is understood that the synchronization of browser changes and/or events is not limited to these examples but may include the synchronization of any change in a browser or any event associated with a browser.

Co-browsing has applications in systems in which one user would like to witness, i.e. shadow, another user's browsing experience. A particular application is in a website served by a corporation to provide information to customers or potential customers. Although corporations strive to make their websites as user friendly as possible, users commonly have questions or encounter difficulties while browsing such websites and require assistance from a customer service representative of the corporation. Co-browsing allows the customer service representative to assist the customer or potential customer as he or she browses the website.

Co-browsing is particularly applicable in the financial services industry. It is common for a financial services corporation to serve a website that provides extensive financial information and services to customers or potential customers. It is also common for the corporation to provide dynamic content on the website, such as a stock ticker, or to allow users to respond to queries by entering data, such as with a financial calculator, that allows the users to perform calculations to help make investment decisions. Co-browsing allows a customer service representative of the corporation to aid in the customer's or potential customer's navigation of the website and input of information (as with financial calculators). More specifically, co-browsing allows the customer service representative to shadow the customer's navigation of the corporation's website and view at least a portion of the data being viewed by the customer.

Figure 2A:
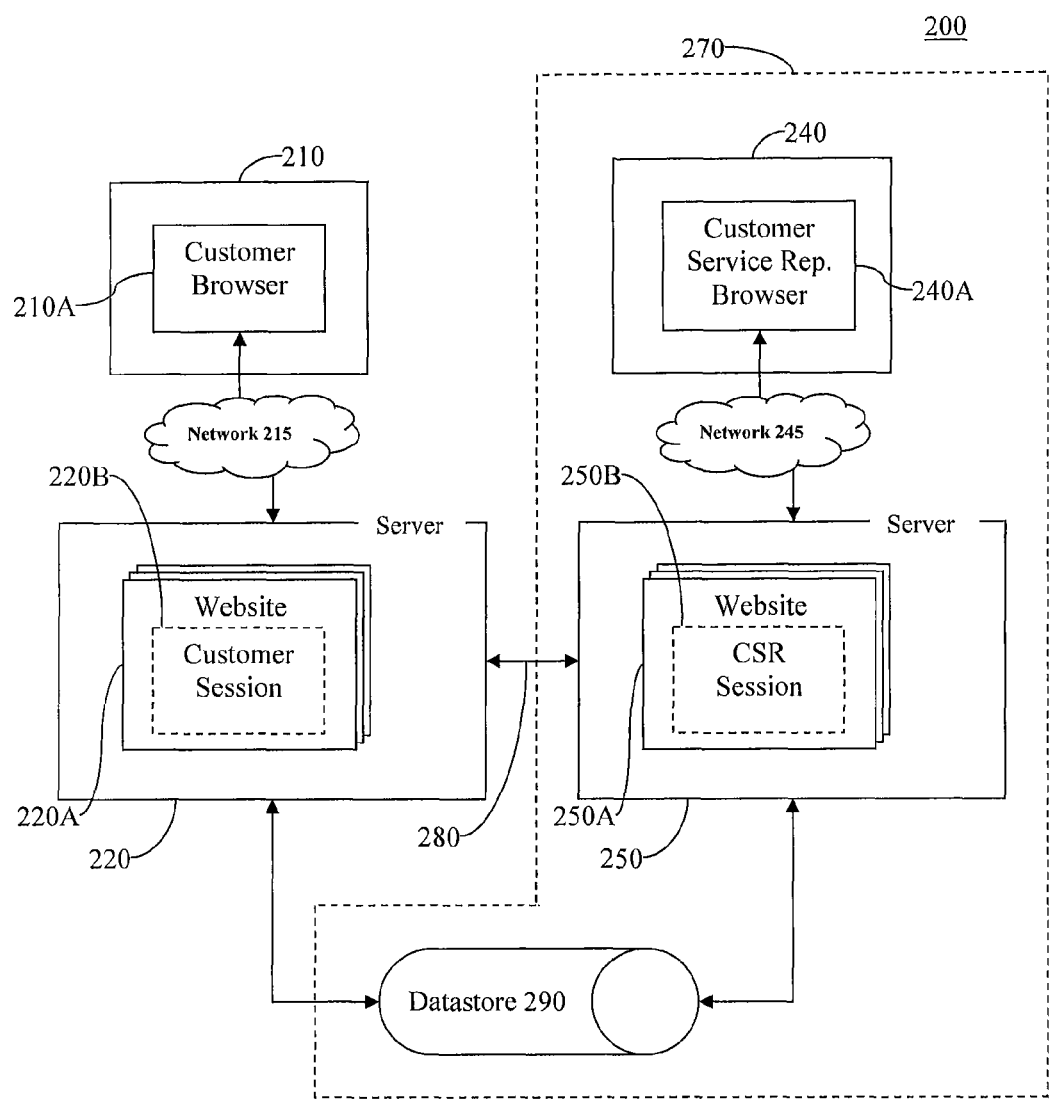
FIG. 2A is a diagram of a co-browsing system comprising a datastore and at least two servers for serving a website, each server comprising a unique session for each user browsing the website, in accordance with an embodiment of the present invention.

Referring now to FIG. 2A, there is illustrated a co-browsing system 200 in accordance with an embodiment the present invention. Co-browsing system 200 includes a customer web browser 210A operated by a customer and a customer service representative ("CSR") web browser 240A operated by a CSR of a corporation. Customer browser 210A is executed on a computer 210 operated by the customer, and CSR browser 240A is executed on a computer 240 operated by the CSR. Although the description herein indicates that the user of computer 210 is a customer of the corporation, it is understood that system 200 is not limited to embodiments in which co-browsing users have a customer/CSR relationship. System 200 has applications in which any two (or more than two) parties would like to co-browse.

Co-browsing system 200 further includes a first server 220 that serves a publicly accessible website 220A over a public network 215 (the Internet) and a second server 250 that serves an internal website 250A over a private network 245 (an intranet). In one embodiment, servers 220 and 250 are separate logical servers, in which case they may be executed on the same physical server as separate processes. In another embodiment, servers 220 and 250 are separate physical servers, in which case they are executed on separate machines. And in another embodiment, servers 220 and 250 are the same logical server on the same physical server.

In the embodiment of co-browsing system 200 illustrated in FIG. 2A, network 215 is the Internet, and network 245 is a private intranet. System 200, however, has applications in any computer network in which collaboration between users is desirable. In an alternative embodiment, both networks 215 and 245 together are the Internet. In another alternative embodiment, both networks are private intranets. Thus, system 200 may be constructed as an entirely private, secured network, an entirely public, open network (the Internet), or a combination of public and private networks. In the embodiment of co-browsing system 200 illustrated in FIG. 2A, computer 240, server 250, and datastore 290 are situated within an internal network behind a firewall 270 operated by the corporation. Firewall 270 protects computer 240, server 250, and datastore 290 from malicious intrusion by unauthorized users and makes network 245 a private intranet. Computer 210 and server 220 are outside firewall 270 and are therefore accessible to the public.

Although FIG. 2A illustrates websites 220A and 250A as distinct elements, these two websites may be thought of as portions of a single website, as that term may be broadly understood. Such website encompasses both website 220A and website 250A, such that portions of such website are accessible as website 220A to the customer and portions of such website are accessible as website 250A to the CSR. In an exemplary embodiment, website 220A is a first set of web pages of such website, and website 250A is a second set of web pages of such website, wherein the second set of web pages is accessible only to the CSR. Each web page in the second set includes at least a portion thereof that is identical in content to at least a portion of a corresponding web page in the first set so that co-browsing between the customer and the CSR is feasible. In another exemplary embodiment, one or more pages in the second set of web pages include additional content that is accessible by the CSR but not by the customer. Thus, this content is not provided in the first set of web pages accessible by the customer. In yet another exemplary embodiment, website 220A is identical to website 250A, or website 220A and website 250A are the same website.

The flexibility in the serving of such website (as understood as the combination of websites 220A and 250A) allows for system 200 to provide certain portions of the second set of web pages to the CSR depending on the CSR's clearance level. Thus, the second set of web pages provides a first set of information to the CSR if the CSR has a first clearance level and provides a second set of information to the CSR if the CSR has a second clearance level. The second set of information may be more sensitive to the corporation than the first set of information, thus requiring the second clearance level. In this way, system 200 may control the ability of CSRs, having different clearance levels, to access information. As a CSR is promoted to higher clearance levels, the CSR may gain access to more information or to more sensitive information.

The customer, using customer browser 210A, connects to website 220A over communications network 215 using an instance of browser 210A. The instance of customer browser 210A, under control of the customer, sends URL requests to server 220. Server 220 responds by providing customer browser 210A with the resources of website 220A associated with the URL requests. Similarly, the CSR connects to website 250A over communications network 245 using an instance of CSR browser 240A. The instance of CSR browser 240A, under control of the CSR, sends URL requests to server 250. Server 250 responds by providing CSR browser 240A with the resources of website 250A associated with the URL requests. For brevity, the instance of customer browser 210A connected to and receiving data from website 220A will be referred to hereinafter simply as "customer browser 210A," and the instance of CSR browser 240A operating analogously will be referred to hereinafter simply as "CSR browser 240A."

Although FIG. 2A illustrates one customer connected to server 220 and one CSR connected to server 250, it is understood that co-browsing system 200 is not limited to having only one customer connected to server 220 and one CSR connected to server 250. Rather, multiple customers or potential customers may connect to server 220 to view website 220A, and multiple CSRs may connect to server 250 to view website 250A. Additionally, although FIG. 2A illustrates one server 220 accessible by customers and one server 250 accessible by CSRs, it is also understood that co-browsing system 200 is not limited to two servers (servers 220 and 250). Rather, co-browsing system may have a plurality of publicly accessible servers accessible by a plurality of customers or potential customers and a plurality of internal servers accessible by a plurality of CSRs or other corporate employees, contractors, agents, etc.

FIG. 2A illustrates a session 220B of website 220A and a session 250B of website 250A. As understood in the art, a session is a collection of data that identifies the interchange between a user and a website. Such information commonly includes, for example, a session identification ("ID") assigned by the server serving the website to the user, information on the user's preferences, the user's authorization level, references to server-side cache, etc.

When the customer connects to server 220 to view website 220A, server 220 creates customer session 220B, which includes a session ID, for the customer. Server 220 communicates the session ID to customer browser 210A which stores it for future use. Similarly, when the CSR connects to server 250 to view website 250A, server 250 creates CSR session 250B, which also includes a session ID, for the CSR. Server 250 communicates the CSR session ID to CSR browser 240A which stores it for future use. Servers 220 and 250 use sessions 220B and 250B and their corresponding customer and CSR session IDs to distinguish the customer and the CSR from other users connected to servers 220 and 250. In an exemplary embodiment, sessions 220B and 250B also store co-browse IDs (explained in more detail below) for the respective customer and CSR, which co-browse IDs are stored therein after co-browsing registration between the customer and CSR is accomplished. Thus, given a session ID for a customer, for example, server 220 consults session 220B to ascertain the co-browse ID for the co-browse session for which the customer has registered. In another exemplary embodiment, servers 220 and 250 maintain the respective co-browse IDs in association with session IDs separately from sessions 220B and 250B.

Servers 220 and 250 provide the websites (respective websites 220A and 250A) or other URL-associated resources (not illustrated) to customer browser 210A and CSR browser 240A, respectively, via the hypertext transfer protocol ("HTTP") and other protocols known in the art. Websites 220A and 250A, and more specifically some or all of the web pages of those websites, include embedded software code and/or script that enable customer browser 210A and CSR browser 240A to communicate with the remainder of system 200 to synchronize browser changes or events. Such browser changes or events include URL (or web page) changes, data changes, mouse-position changes (mouse movements), and scroll-bar-positions. The discussion below with reference to FIGS. 6-9 describes methods of synchronizing browser changes (generally) and various kinds of browser changes (specifically). As described in more detail there, the embedded software code and/or script identifies how the browsers are to report changes within the browsers to their associated servers to synchronize such changes and how the browsers are to handle messages from their associated servers reporting changes in the browsers of co-browsing users.

In an exemplary embodiment of co-browsing system 200, the embedded software code and/or script includes event handlers to facilitate the co-browsing. Certain event handlers are triggered by changes within browsers 210A and 240A that cause the event handlers to be executed and/or interpreted to inform respective servers 220 and 250 of the changes within the browsers. Others are triggered on a periodic basis and cause browsers 210A and 240A to retrieve from respective servers 220 and 250 information on changes in co-browsing browsers in co-browsing system 200.

In a further exemplary embodiment of co-browsing system 200, the embedded software code and/or script is JavaScript that specifies Asynchronous JavaScript and XML ("AJAX") requests to be sent by browsers 210A and 240A to respective servers 220 and 250 and how messages received from servers 220 and 250 are to be handled. More specifically, the JavaScript includes portions that are interpreted by customer browser 210A and CSR browser 240A (1) at periodic intervals to request changes from the servers and (2) to notify the servers of changes and/or events within each user's browser. These requests and notifications take the form of AJAX requests and are transported using HTTP (or HTTPS, where necessary for security). As described with more particularity below with respect to FIGS. 3-10, AJAX calls originating from a co-browsing user's browser include the following: "SaveData" (save current-page data), "GetChange" (get browser changes), "URLSave" (save co-browsed URL), "Initiate" (co-browse with a client), "CoBrowse" (enable co-browse), and "NoCoBrowse" (disable co-browse).

The term "software code" or "code" used herein refers to any instructions or set of instructions that influence the operation of a computer. They may exist in a computer-executable form, such as machine code, which is the set of instructions and data directly executed by a computer's central processing unit, a human-understandable form, such as source code, which may be compiled in order to be executed by a computer, or an intermediate form, such as object code, which is produced by a compiler. As used herein, the term "software code" or "code" also includes any human-understandable computer instructions or set of instructions that may be executed on the fly from a human-understandable form with the aid of an interpreter. Finally, the term "software script" or "script" used herein refers to any computer instructions or set of instructions that may interpreted but do not require compilation into machine code for execution by a computer.

Co-browsing system 200 includes a datastore 290 that serves to associate users as they register for co-browsing, i.e., datastore 290 performs a "handshake" between or among users as they register for co-browsing. In one scenario, a customer registers for co-browsing, and datastore 290 is updated to reflect the customer's registration. During registration of a CSR for co-browsing with the already registered customer, datastore 290 locates the registered customer and then updates to reflect that the customer and the CSR are associated for co-browsing, i.e., the CSR is registered for co-browsing with the customer. In a similar way, a customer is registered for co-browsing with a CSR who has previously registered. Registration is explained in more detail below with respect to FIGS. 3-5.

Figure 2B:
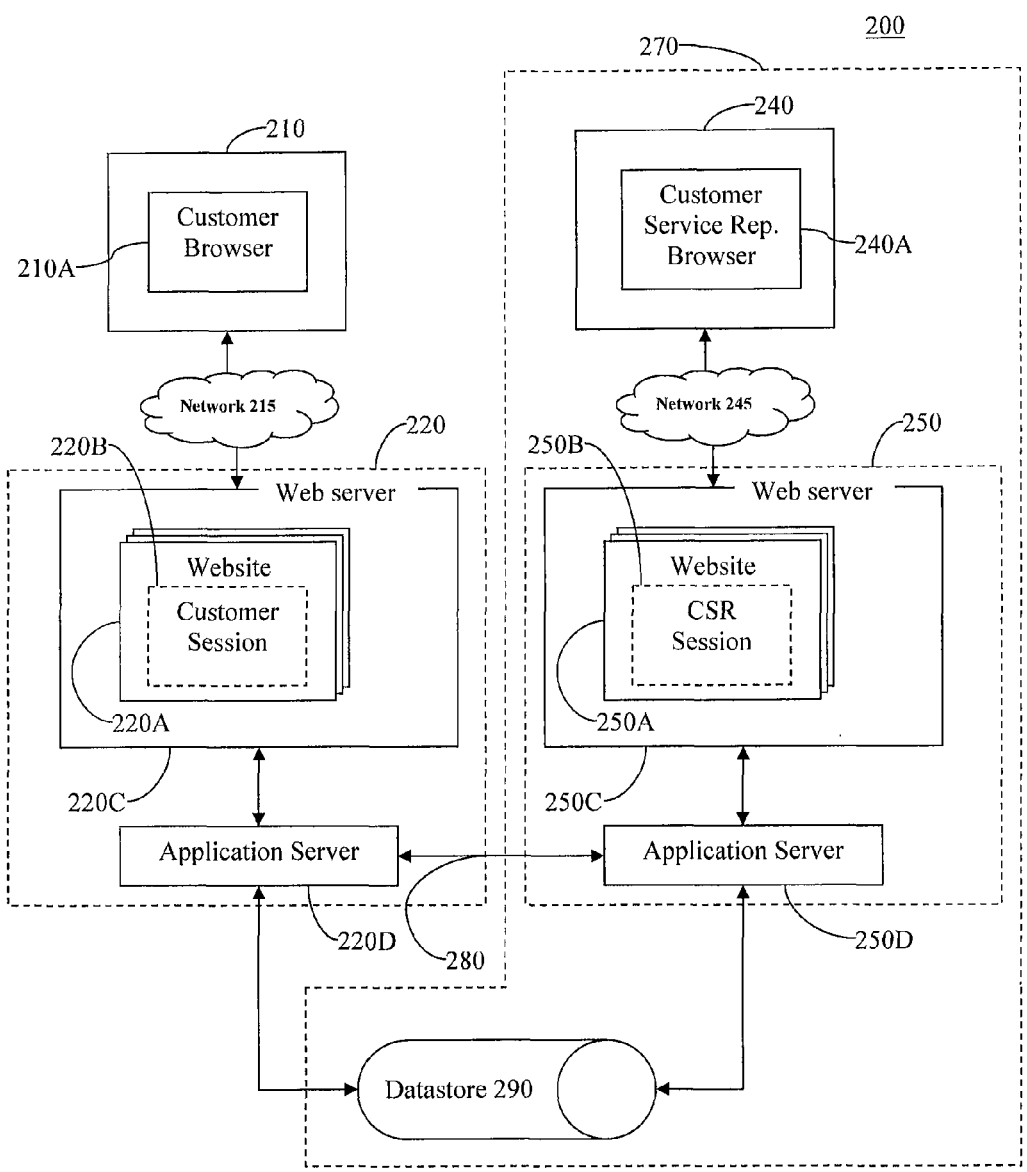
FIG. 2B is a diagram of a co-browsing system comprising a datastore and at least two servers, each server comprising a web server for serving a website, an application server, and a unique session for each user browsing the website, in accordance with an embodiment of the present invention.
Figure 2C:
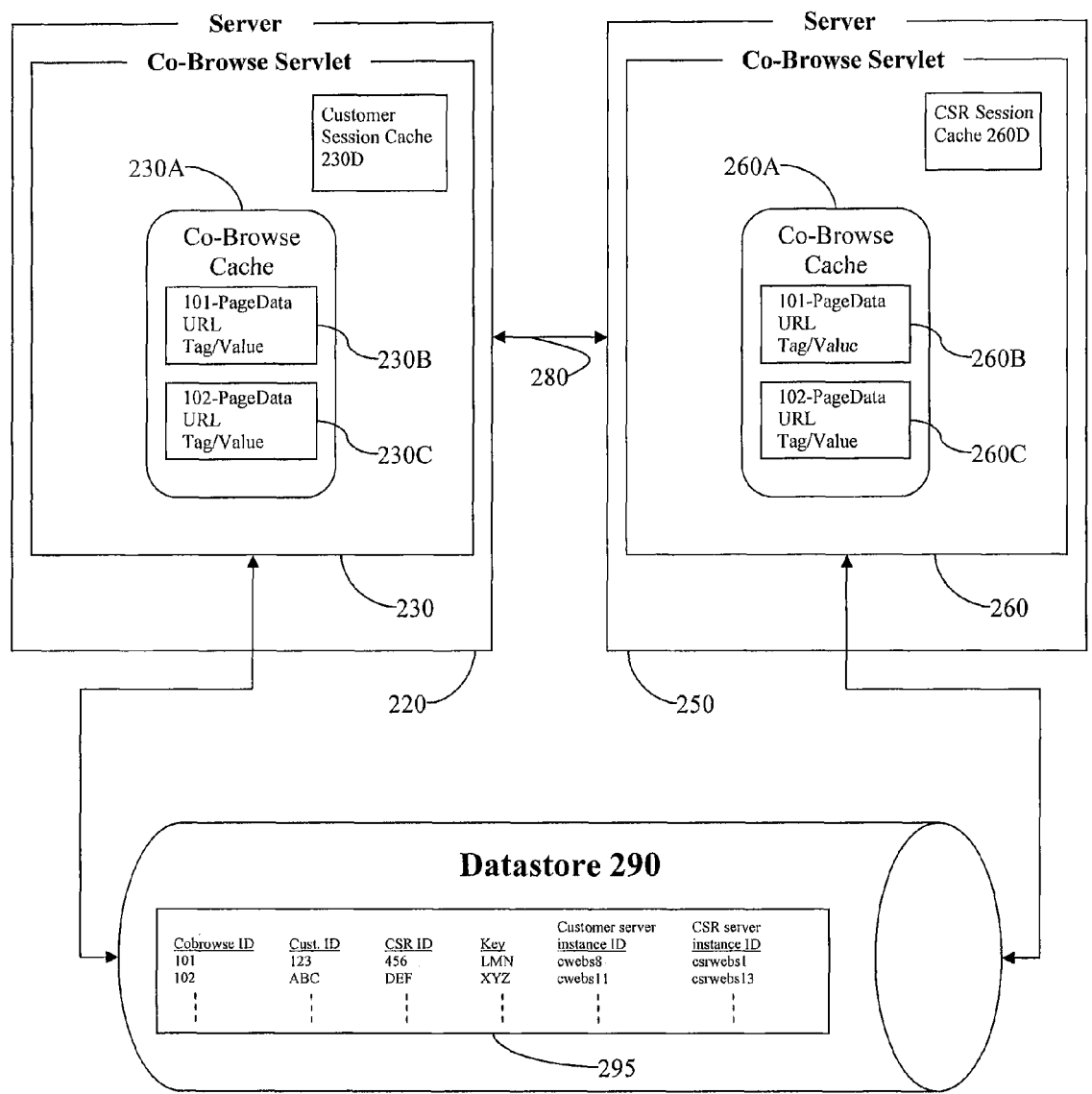
FIG. 2C is an illustration of the servers and the datastore of the co-browsing systems illustrated in FIGS. 2A and 2B, in accordance with an embodiment of the present invention.

Referring now to FIG. 2C, there is illustrated a table 295 within datastore 290. Datastore 290 maintains table 295 to track the associations between registered co-browsing users (i.e., the customer and the CSR) accessing websites 220A and 250A. For each association identified in table 295, there is a co-browse ID that identifies the co-browsing session that has been created. For each co-browse ID, there are entries for a customer ID, a CSR ID, a key ID, a customer server instance ID, and a CSR server instance ID. The customer ID and the CSR ID are personal ID numbers for the CSR and the customer. Thus, given a personal ID for a first user, datastore 290 is able to discern the personal ID of a second user registered for co-browsing with the first user from all other personal IDs for users logged within datastore 290. An example of a personal ID number is an account number.

In the exemplary embodiment of datastore 290 illustrated in FIG. 2C, there is particularly illustrated two registered co-browsing sessions. Co-browse ID 101 indicates a first registered co-browsing session between a customer having a customer ID of 123 and a CSR having a CSR ID of 456. The key ID associated with this registration is LMN. The customer server instance ID is cwebs8, and the CSR server instance ID is csrwebs1. Co-browse ID 102 indicates a second registered co-browsing session between a customer having a customer ID of ABC and a CSR having a CSR ID of DEF. The key ID associated with this registration is XYZ. The customer server instance ID is cwebs11, and the CSR server instance ID is csrwebs13. The dashed lines illustrated in table 295 indicate that datastore 290 may store any number of registered co-browsing sessions.

After the handshake between the co-browsing users is completed by datastore 290, datastore 290 notifies the servers associated with the co-browsing users of each other's server instance ID. Thus, datastore 290 notifies server 220 of the server instance ID for server 250 and notifies server 250 of the server instance ID for server 220. Servers 220 and 250 are thereby informed of each other's location so that they may communicate efficiently with one another. In one exemplary embodiment, the servers store the server instance IDs in sessions 220B and 250B. In another exemplary embodiment, the servers track each other's server instance ID in a data structure separate from sessions 220B and 250B.

Co-browsing system 200 includes a communications pathway 280 that couples server 220 to server 250, so that servers 220 and 250 are able to communicate the browser changes or events associated with co-browsing users' sessions to each other to thereby synchronize the collaborating users' browsing. When server 220 detects a change within customer session 220B (originating within customer browser 210A), server 220 determines the web server instance ID for server 250 and sends the change to server 250 via communications pathway 280. Server 250 analogously notifies server 220 of changes within CSR session 250B (originating within CSR browser 240A). By notifying each other of changes in sessions 220B and 250B (more specifically, within customer browser 210A and CSR browser 240A), servers 220 and 250 together act as a collaboration manager for synchronizing the changes in the browsers, i.e., for effecting co-browsing between the browsers (browsers 210A and 240A) of co-browsing users.

By embedding software code and/or script, such as JavaScript, within the web pages of websites 220A and 250A, co-browsing system 200 achieves co-browsing without requiring applets, plug-ins, or other separate executable software running on computers 210 and 240. The lack of these features reduces security risks, and the omission of proxy servers simplifies network administration. Additionally, the lack of browser plug-ins, applets, or other separate executable programs allows for a user to begin collaboration by simply visiting a web page that includes appropriate embedded software code and/or scripts. The user is not required to wait for applets or plug-ins to download and execute or for a Java Virtual Machine to initialize. The user is also not required to visit a web-page portal in the website to begin collaboration. Rather, the user may begin collaboration from any page in a website having the embedded software code and/or script described herein.

By embedding the code and/or script within the web pages of the website, no windows additional to the ones operated by the co-browsing users in their browsers, nor any frames other than those displayed on the browsers, are required. The lack of a need for separate or additional browser windows or frames to run the co-browsing code and/or script allows for an uncluttered co-browsing experience. It also promotes efficiency, as frames and extra browser windows drain the resources of computers. Browser instances 210A and 240A, themselves, under direction of the embedded software code and/or script are sufficient to effect co-browsing in an appropriately configured co-browsing system 200.

In an exemplary embodiment of co-browse system 200, portions of or all of websites 220A and 250A are accessible only to users who have adequate permission. Such users have accounts with usernames that permit them to login to servers 220 and 250 to access the restricted portions. In such an embodiment, co-browse system 200 maintains one or more logs of users who have logged into their accounts to access the restricted portions of websites 220A and 250A. Such logs include the IDs of all such users and IDs of the server instances to which the users have connected. Such logs may also include the session IDs of such users.

Each of the servers in co-browse system 200 may maintain copies of such logs, or system 200 may designate only one of such servers to maintain the log. As is explained in more detail below with reference to FIG. 5, servers 220 and 250 may access the one or more logs to locate a user connected to one of the servers in co-browse system 200 to complete the handshake during registrations. In such an embodiment, the sessions established by the servers in system 200 store the personal IDs for the corresponding users. Thus, when the customer connects to website 220A and session 220B is formed, the customer ID is stored within session 220B. The CSR ID is analogously stored within session 250B.

Referring now to FIG. 2B there is illustrated another embodiment of co-browsing system 200. In this embodiment, server 220 comprises a web server 220C and an application server 220D, and server 250 comprises a web server 250C and an application server 250D. The implementation of web servers 220C and 250C is flexible. Thus, web servers 220C and 250C may be separate logical servers, in which case they may be executed on the same physical server as separate processes, or they may be separate physical servers, in which case they are executed on separate machines, or they may be the same logical server on the same physical server. The implementation of application servers 220D and 250D is similarly flexible.

Application servers 220D and 250D together act as a collaboration manager much as the collaboration manager described above in relation to FIG. 2A. Thus, application servers 220D and 250D work together to share browser changes or events with one another to effect co-browsing between the customer and the CSR. In an exemplary embodiment, application servers 220D and 250D run within Iava Virtual Machines ("JVM" in singular and "JVMs" in plural). By configuring application servers 220D and 250D to run within JVMs, the co-browsing code of the collaboration manager is platform independent, i.e. independent of the type of operating system within which the JVMs are executed.

Referring again to FIG. 2C, there are illustrated servers 220 and 250 of both the embodiments of co-browsing system 200 discussed above. Server 220 includes a co-browse servlet 230, and server 250 includes a co-browse servlet 260. In the exemplary embodiment of co-browse system 200 illustrated in FIG. 2A, co-browse servlet 230 runs within server 220, and servlet 260 runs within server 250. In the exemplary embodiment of co-browse system 200 illustrated in FIG. 2B, co-browse servlet 230 runs within application server 220D, and co-browse servlet 260 runs within application server 250D. Although the discussion below refers to co-browse servlets 230 and 260 operating within servers 220 and 250, it is understood that such discussion is relevant to the exemplary embodiment in which the co-browse servlets run within application servers, with appropriate modifications.

Co-browse servlet 230 maintains a co-browse cache 230A, and co-browse servlet 260 maintains a co-browse cache 260A. Co-browse caches 230A and 260A maintain tables 230B, 230C, 260B, and 260C that specify browser events and changes, such as changes in the URLs (including web-page addresses), data, mouse positions, and scroll-bar positions, for co-browsing sessions. Each of tables 230B, 230C, 260B, and 260C is identified by a co-browse ID, as defined above. Thus, table 230B is identified by co-browse ID 101 and table 230C is identified by co-browse ID 102.

Each co-browse cache stores, among other things, a URL and a plurality of Tag/Value pairs (PageData) associated with a co-browse session. The Tag identifies an object on a co-browsed web page and the paired Value identifies the dynamic or user-inputted data associated with the Tag-identified object. Examples of objects that may be tagged include text boxes, drop-down lists, checkboxes, radio buttons, scroll bars, and the mouse cursor. Examples of possible "Values" include alphanumeric strings for text boxes, the particularly selected items for drop down lists, "checked" or "unchecked" for checkboxes and radio buttons, and positions for scroll bars and mouse cursors.

In an exemplary embodiment, co-browse servlets 230 and 260 maintain server-side caches for connected users. Co-browser servlet 230 maintains a server-side cache 230D for the customer browsing website 220A, and co-browser servlet 260 maintains a server-side cache 260D for the CSR browsing website 250A. Customer session cache 230D stores a history of browser changes and/or events in customer browser 210A. CSR session cache 260D stores a history of browser changes and/or events in CSR browser 240A. More specifically, the caches include information on the URLs accessed by users and dynamic data entered by the users during their sessions with the website. In a further exemplary embodiment, caches 230D and 260D additionally store mouse movements and scroll-bar positions of the respective co-browsing users.

Servers 220 and 250 maintain respective session caches 230D and 260D of respective customer session 220B and CSR session 250B prior to the formation of a collaboration session between the customer and the CSR, i.e. prior to their registration in datastore 290. After the customer and CSR register for co-browsing, servers 220 and 250 share at least a portion of these caches 230D and 260D with each other as needed to effect collaboration. For example, customer session cache 230D shares at least a portion of customer session cache 230D with server 250, which portion is sufficient to enable CSR browser 240A to reflect browser changes and/or events in customer browser 210A, which browser changes and/or events occurred prior to the collaboration manager being established. Likewise, CSR session cache 260D shares at least a portion of the CSR session cache 260D with server 220, which portion is sufficient to enable customer browser 210A to reflect browser changes and/or events in CSR browser 240, which browser changes and/or events occurred prior to the collaboration manager being established.

During a collaboration session, the sharing of server-side caches 230D and 260D may be required, for example, when the customer selects the back button in browser 210A to direct browser 210A back to a page previously visited before collaboration was established. If such page included dynamically entered data (entered by the user), without the sharing of cache 230D with server 250, CSR browser 240A would be unable to view such data. Thus, in such a scenario, server 220 shares appropriate portions of customer session cache 230D with server 250, so that CSR browser 240A is able to display such data. The sharing of the caches may be performed on an "on demand" basis such that cache 230D provides data to server 250 only when server 250 needs to provide such data to CSR browser 240A to facilitate co-browsing. CSR cache 260D also provides server 220 with data required to facilitate co-browsing on an "on demand" basis. Servers 220 and 250 also maintain respective caches, including caches 230D and 260D, during co-browsing between the customer and the CSR to allow the users to return to previously visited web pages and still have access to previously entered dynamic data.

Figure 3:
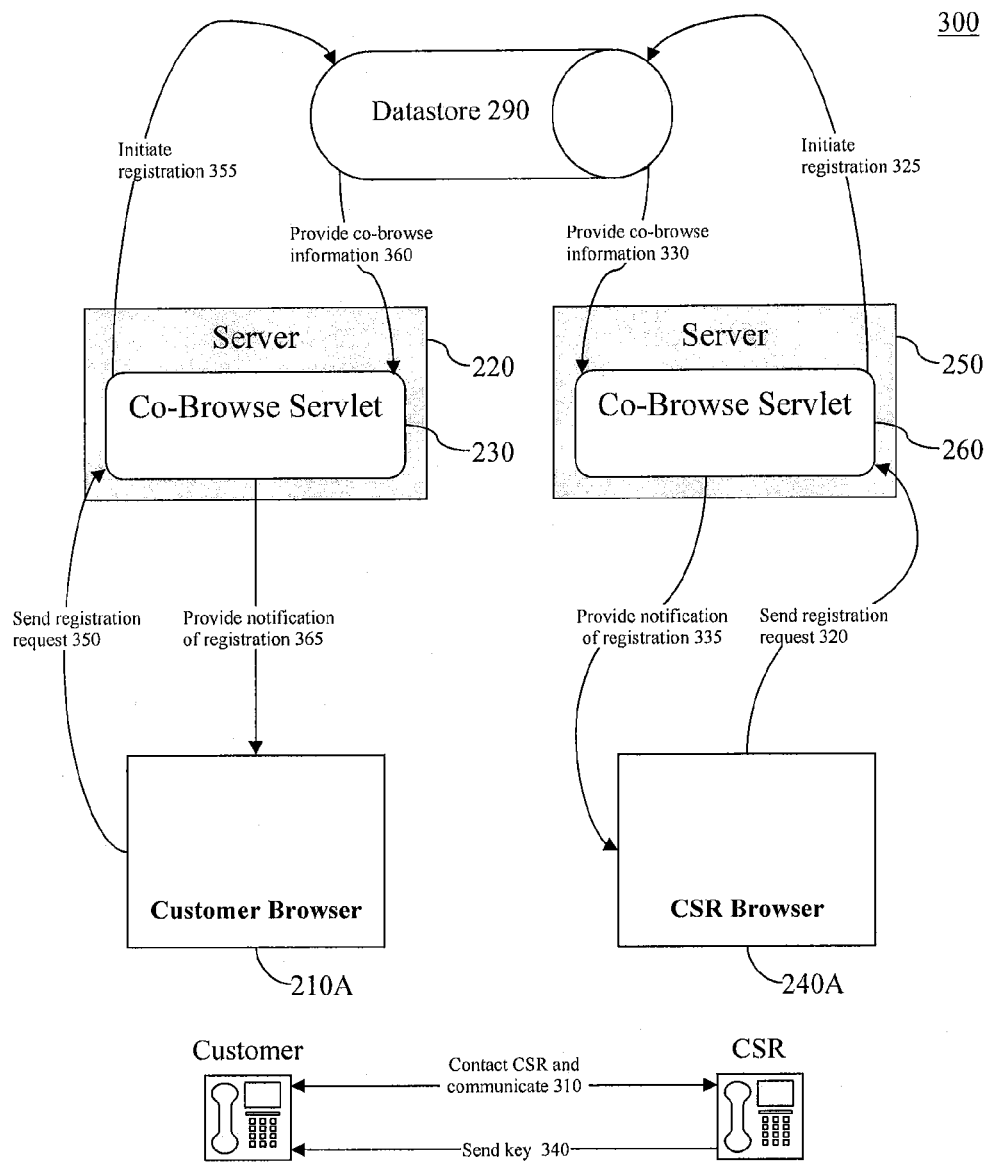
FIG. 3 illustrates a method of registering web sessions with a datastore for co-browsing, wherein registration with the datastore is initiated by a customer service representative, in accordance with an embodiment of the present invention.

FIG. 3 illustrates a method 300 of registering users in system 200 for co-browsing. More specifically, method 300 illustrates the procedures by which the customer and the CSR register with datastore 290, wherein the CSR initiates registration in datastore 290 before the customer.

To initiate co-browsing, in step 310, the customer makes contact with the CSR via a communication channel to consult with the CSR. In the exemplary embodiment illustrated in FIG. 3, the customer makes such contact via a telephone. In other exemplary embodiments, the customer makes such contact using Voice over Internet Protocol ("VoIP"), a chat room, instant messaging, text messaging, electronic mail ("e-mail"), video conferencing, etc. Any known method of communication between two users may be used to allow the customer to make contact with the CSR in step 310.

In step 310, the customer provides the CSR with unique identification information about the customer via the communication channel. The unique identification information may be a unique number that identifies the user, such as an account number or personal identification number, or may be the customer's username for an account the customer has with the corporation. The unique identification information allows the CSR to retrieve information about the customer, which unique identification information may be displayed to the CSR as one or more web pages, at least a portion of which is not accessible by the customer. The information about the customer may provide details on the customer, such as the customer's account. In an embodiment in which the company is a financial services provider, such an account may comprise the customer's portfolio, i.e. investments.

In a further exemplary embodiment, in step 310, the customer dials a telephone number and connects with a voice recognition unit ("VRU"). Through interacting with the VRU, the customer enters account information to identify himself. The customer is then connected to the CSR, and the CSR's computer 240 automatically loads the account information of the customer. Such information may be rendered in CSR browser 240A as a set of web pages, at least a portion of which is not accessible to the customer. The set of web pages rendered in CSR browser 240A may include the unique identification information, such as the account number, provided by the customer. The portion of the web pages not accessible to the customer may include corporate internal information not for dissemination to the public.

Continuing in FIG. 3, after the customer and the CSR establish contact, in step 310, the CSR may then respond to the customer over the communication channel and suggest that the customer and CSR co-browse. The CSR may make such a suggestion when, for example, the customer has contacted the CSR with questions concerning the customer's browsing session in website 220A. The customer responds over the communication channel giving his approval.

In step 320, the CSR via CSR browser 240A initiates registration with co-browse system 200 by sending a registration request with registration data to server 250, specifically to co-browse servlet 260. The registration is sent as a result of the CSR clicking a button or hyperlink rendered within browser 240A. The registration data includes the session ID for the CSR's browsing session (session 250B) of website 250A. In an exemplary embodiment, the registration request takes the form of an "Initiate" AJAX request. After receiving the registration request, co-browse servlet 260 registers the CSR for co-browsing in datastore 290, albeit without an association with the customer yet.

After receipt of the registration data from CSR browser 240A, server 250 uses the CSR's session ID to identify the CSR ID which is stored within CSR session 250B. To register the CSR in datastore 290 for co-browsing, in step 325, co-browse servlet 260 generates a key ID and sends it along with the CSR ID and the server instance ID for server 250 to datastore 290. Datastore 290 receives this information, creates a new entry within registration table 295, and stores this information (the CSR ID, the server instance ID, and the key ID) in the new entry. The registration of the CSR within datastore 290 is thereby complete. In another exemplary embodiment, datastore 290 generates the key ID rather than co-browse servlet 260.

After the CSR has been registered in datastore 290, in step 330, datastore 290 notifies co-browse servlet 260 of the registration including the newly issued co-browse ID and the key ID. In step 335, co-browse servlet 260 notifies browser 240A of the registration, causing CSR browser 240A to refresh to display the key ID and illustrate that the CSR has registered for co-browsing.

In step 340, the CSR notifies the customer of the key ID and informs the customer of the ability to register for co-browsing. After receiving confirmation of the CSR's registration, the customer initiates registration for co-browsing by commanding browser 210A to begin the registration process by selecting a button or hyperlink rendered within the browser. Customer browser 210A displays a query requesting authorization to create a collaborative browsing session. The customer indicates his consent, and in step 350, the customer via customer browser 210A sends a registration request with registration data to server 220. More specifically, in step 350, the customer enters the key ID provided by the CSR into customer browser 210A and clicks on a button or link that indicates that the customer requests co-browsing. Upon the selection of the button or link, customer browser 210A sends the registration data, which includes the session ID for the customer's browsing session (session 220B) of website 220A and the key ID, to co-browse servlet 230. In an exemplary embodiment, the registration request takes the form of a "CoBrowse" AJAX request. Server 220 receives the registration request and registers the customer for co-browsing.

After receipt of the registration data from customer browser 210A, server 220 uses the customer's session ID to identify the customer ID stored within customer session 220B. To register the customer in datastore 290 for co-browsing, in step 355, co-browse servlet 230 sends the key ID along with the customer ID and the server instance ID for server 220 to datastore 290. Datastore 290 receives this information and, using the key ID entered by the customer, locates the entry corresponding to the CSR registered within table 295. Datastore 290 stores the customer ID and the server instance ID in this entry and retrieves the co-browse ID stored within the entry. The handshake between the customer and the CSR in datastore 290 is thereby complete.

In step 360, datastore 290 provides co-browse information comprising the co-browse ID to co-browse servlet 230, and in step 365, co-browse servlet 230 notifies browser 210A of the registration, which notification causes customer browser 210A to refresh to display that the customer has successfully registered for co-browsing with the CSR. Registration of the customer for co-browsing with the CSR is thereby complete.

Figure 4:
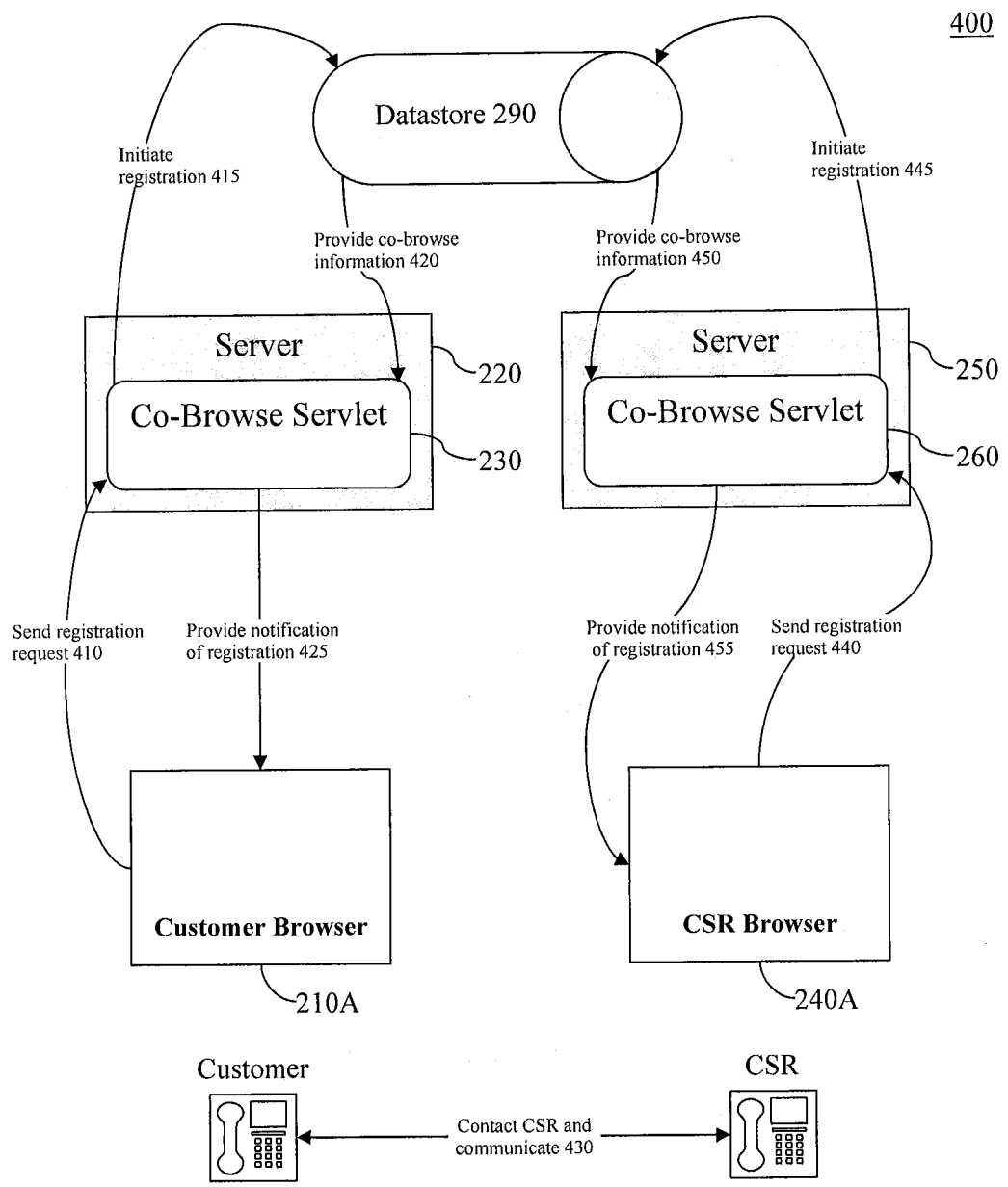
FIG. 4 illustrates a method of registering web sessions with a datastore for co-browsing, wherein registration with the datastore is initiated by a customer, in accordance with an embodiment of the present invention.

FIG. 4 illustrates another method 400 of registering users in system 200 for co-browsing. Generally, method 400 differs from method 300 in that method 400 describes a scenario in which the customer registers in datastore 290 before the CSR. As described above, method 300 describes a scenario in which the CSR registers in datastore 290 before the customer. Method 400 presumes that the customer and the CSR are logged into the appropriate account or accounts, i.e., logged into the appropriate web-based account or accounts, and that system 200 maintains a login list for all users that are logged in. Such list includes the customer and CSR IDs and other information that uniquely identifies them.

In step 410, the customer via customer browser 210A initiates registration with co-browse system 200 by sending a registration request with registration data to server 220, specifically to co-browse servlet 230. The request is sent as a result of the customer selecting or mouse clicking on a button or hyperlink rendered within browser 210A. The registration data includes the session ID for the customer's browsing session (session 220B) of website 220A. In an exemplary embodiment, the registration request takes the form of the "Initiate" AJAX request.

After receipt of the registration data from customer browser 210A, server 220 uses the customer's session ID to identify the customer ID which is stored within customer session 220B at the time of the customer's login. To register the customer in datastore 290 for co-browsing, in step 415, co-browse servlet 230 sends the customer ID along with the server instance ID for server 230 to datastore 290. Datastore 290 receives this information, creates a new entry within registration table 295, and stores this information (the customer ID and the server instance ID for server 230) in the new entry. Datastore 290 also generates a unique co-browse ID and stores this ID in the new entry within registration table 295. The registration of the customer within datastore 290 is thereby complete.

After the customer has been registered in datastore 290, in step 420, datastore 290 notifies co-browse servlet 230 of the newly issued co-browse ID. In step 425, co-browse servlet 230 notifies browser 210A of the registration, which notification causes customer browser 210A to refresh to display that the customer has registered for co-browsing.

In step 430, the customer makes contact with the CSR via a communication channel and provides the CSR with unique information about the customer. Step 430 is analogous to step 310 described above. During the course of the customer's conversation with the CSR, the CSR requests permission to co-browse with the customer. If the customer consents, the CSR registers for co-browsing.

In an exemplary embodiment of method 400, in step 430, the customer dials a telephone number and connects with a VRU. Through interacting with the VRU, the customer enters account information to identify himself. The customer is then connected to the CSR, and the CSR's browser 240A automatically loads the account information of the customer. The customer and the CSR then converse, and the CSR requests permission to co-browse.

Continuing, in step 440, the CSR via CSR browser 240A sends a registration request with registration data to server 250, specifically to co-browse servlet 260. More specifically, in step 440, the CSR selects a button or hyperlink rendered within browser 240A to send the registration request. The registration data includes the session ID for the CSR's browsing session (session 250B) of website 250A and the unique information about the customer. In an exemplary embodiment, the registration request takes the form of a "CoBrowse" AJAX request.

Servlet 260 receives the registration request and registers the CSR for cobrowsing. In the exemplary embodiment of method 400 in which the customer connects to the CSR via a VRU, the registration data submitted by CSR browser 240A need not include the unique information that identifies the customer, as server 250 is already aware of the customer's identification. Otherwise, the CSR includes such information (the information about the customer) in the registration data included in the registration request.

After receipt of the registration data from CSR browser 240A, servlet 260 uses the CSR's session ID to identify the CSR ID stored within CSR session 250B. If necessary, servlet 260 also consults with the login list maintained by system 200 to ascertain the customer ID from the information provide by the customer to the CSR during contact in step 430. To register the CSR in datastore 290 for co-browsing with the already registered customer, in step 445, co-browse servlet 260 sends the CSR ID and the customer ID to datastore 290. Using the customer ID, datastore 290 locates the entry corresponding to the customer registered within table 295. Datastore 290 then stores the CSR's ID in this entry and retrieves the associated co-browse ID. The handshake between the customer and the CSR in datastore 290 is thereby complete.

In step 450, datastore 290 provides co-browse information comprising the co-browse ID to co-browse servlet 260, and in step 455, co-browse servlet 260 notifies browser 240A of the registration, which notification causes CSR browser 240A to refresh to display that the CSR has successfully registered for co-browsing with the customer. The registration of CSR is thereby completed.

Figure 5:
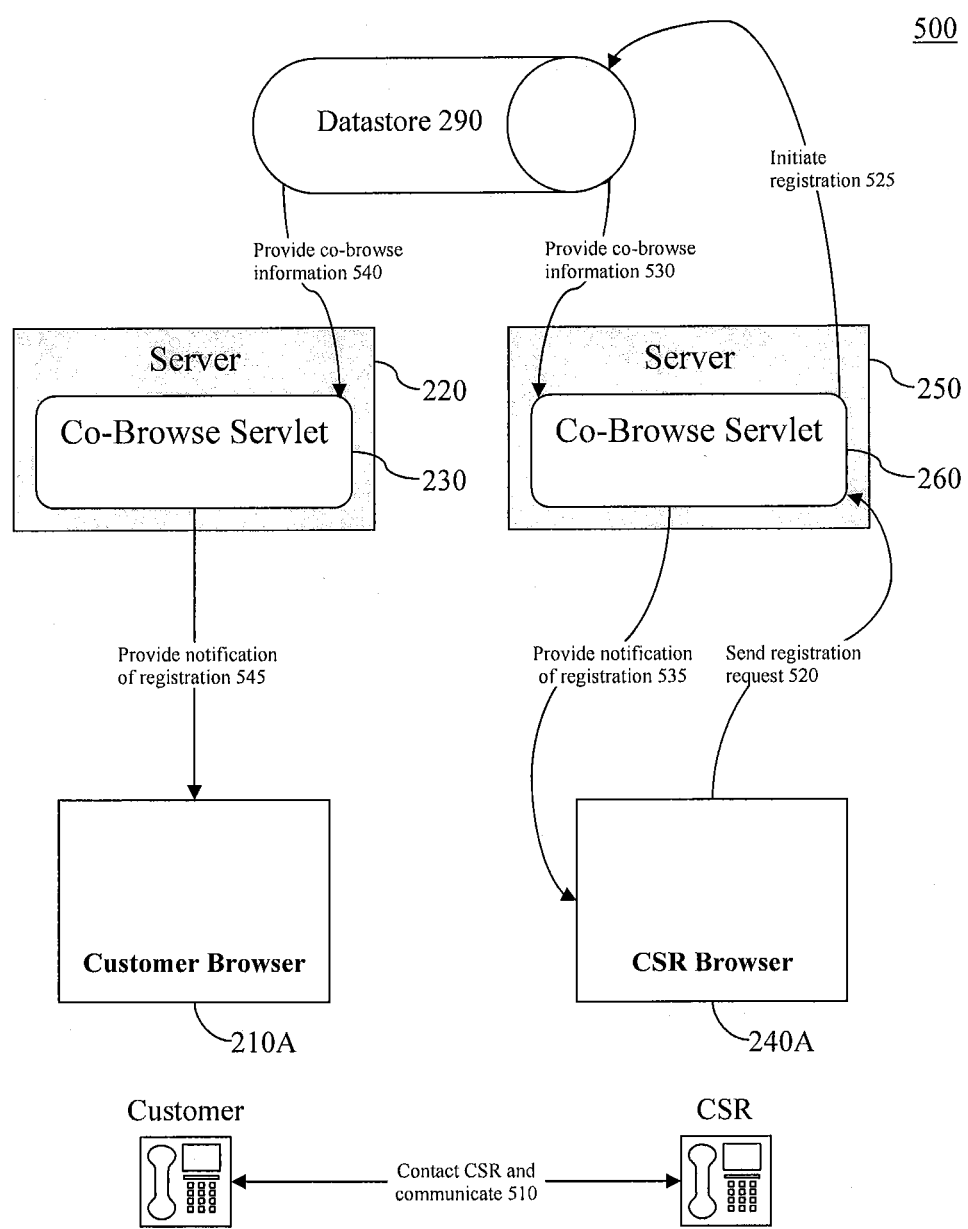
FIG. 5 illustrates a method of registering web sessions with a datastore for co-browsing, wherein a customer need not issue a request from a web browser to effect registration for co-browsing with a customer service representative, in accordance with an embodiment of the present invention.

FIG. 5 illustrates yet another method 500 of registering users for co-browsing. Generally, method 500 differs from methods 300 and 400 in that method 500 does not require the customer to issue a request from browser 210A to co-browse. As with method 400, method 500 presumes that the customer and the CSR are logged into their accounts, i.e., logged into their web-based accounts, and that system 200 maintains a login list for all users that are logged in. Such list includes the customer and CSR IDs, other information that uniquely identifies them, and the server instance IDs for users connected to servers of system 200.

In step 510, the customer makes contact with the CSR via a communication channel and provides the CSR with unique information about the customer via the communication channel. The unique information may be the customer's account number, personal identification number, or username, among other things. During the course of the customer's conversation with the CSR, the CSR requests permission to co-browse with the customer. If the customer consents, the CSR registers for co-browsing.

In an exemplary embodiment of method 500, in step 510, the customer dials a telephone number and connects with a VRU. Through interacting with the VRU, the customer enters account information to identify himself. The customer is then connected to the CSR, and the CSR's computer 240 automatically loads the account information of the customer. The customer and the CSR then converse, and the CSR requests permission to co-browse.

Continuing: In step 520, the CSR via CSR browser 240A sends a registration request with registration data to server 250, specifically to co-browse servlet 260. The request is sent as a result of the CSR selecting or mouse clicking on a button or hyperlink rendered within browser 240A. The registration data includes the session ID for the CSR's browsing session (session 250B) of website 250A and the unique information that identifies the customer. In an exemplary embodiment, the registration request takes the form of an "Initiate" AJAX request.

Servlet 260 receives the registration request and registers the CSR for co-browsing. In the exemplary embodiment of method 500 in which the customer connects to the CSR via a VRU, the registration data submitted by CSR browser 240A need not include the unique information that identifies the customer, as server 250 is already aware of the customer's identification. Otherwise, the CSR includes such information (the information about the customer) in the registration data included in the registration request.

After receipt of the registration data from CSR browser 240A, servlet 260 uses the CSR's session ID to identify the CSR ID stored within CSR session 250B. If necessary, servlet 260 also consults with the login list maintained by system 200 to ascertain the customer ID and the server instance ID for customer server 220 from the information provided by the customer to the CSR during contact in step 510 or provided to the VRU as described above. To register the customer and the CSR in datastore 290, in step 525, co-browse servlet 260 sends the CSR ID, the customer ID, the customer server instance ID, and the CSR server instance ID to datastore 290.

Datastore 290 receives this information, creates a new entry within registration table 295, and stores this information in the new entry. Thus, the handshake between the customer and the CSR in datastore 290 is complete. No key is stored within datastore 290. As can be seen, other than calling the CSR in step 510 or the VRU as described above, the customer need take no steps to complete registration for co-browsing.

During registration of the customer and the CSR, datastore 290 generates a unique co-browse ID and stores this ID in the new entry within registration table 295. As described in more detail below, co-browsing system 200 uses the co-browse ID to link browsing sessions 220B and 250B of the customer and the CSR to achieve co-browsing.

After the customer and the CSR have been registered by co-browse servlet 260 in datastore 290, in step 530, datastore 290 notifies co-browse servlet 260 of the newly issued co-browse ID. In step 535, co-browse servlet 260 notifies browser 240A of the registration, which notification causes CSR browser 240A to refresh to display that the CSR has successfully registered for co-browsing. In step 540, datastore 290 provides co-browse information comprising the co-browse ID and the server instance ID for server 250 to co-browse servlet 230. In step 545, co-browse servlet 260 notifies browser 210A of the registration, which notification causes customer browser 210A to refresh to display that the customer has successfully registered for co-browsing with the CSR.

Synchronization of Browser Changes and/or Events

Figure 6:
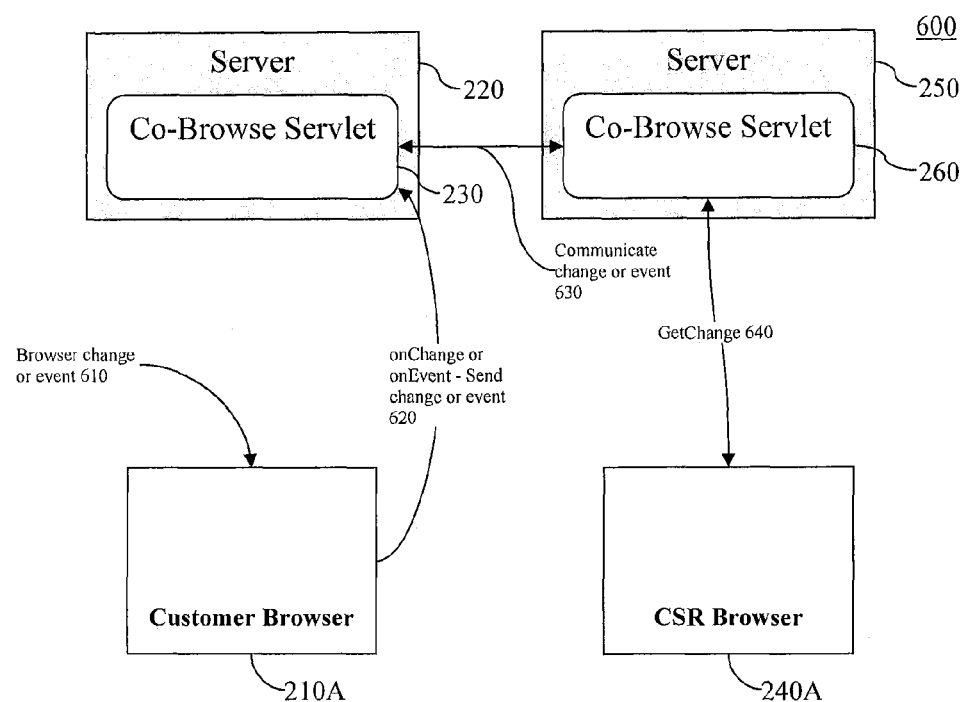
FIG. 6 illustrates a method of synchronizing web browser changes and/or events between or among two or more collaborating web browsers, in accordance with an embodiment of the present invention.

FIG. 6 illustrates a method 600 of synchronizing browser changes or events between browsers 210A and 240A. Method 600 presumes that the customer and the CSR have registered for a co-browsing session identified as co-browse ID 101 illustrated in FIG. 2C.

In step 610, customer browser 210A is subjected to a browser change or event. Such change may include a changed URL, a change in data displayed within browser 210A, a mouse movement, etc. In step 620, customer browser 210A sends a notification of the browser change or event to server 220, specifically to co-browse servlet 230, along with the customer session ID.

As described above, the web pages of website 220A rendered within customer browser 210A include embedded software code and/or script. In an exemplary embodiment, the embedded software code and/or script includes one or more event handlers that identify or capture events triggered by the browser changes. Thus, as a result of the browser change in step 610, an event handler sends a notification of the change to co-browse servlet 230 in step 620.

Continuing in FIG. 6, co-browse servlet 230 receives the notification of the browser change and, using the customer session ID included in the message, determines the co-browse ID (co-browse ID 101) associated with the customer. As described above, the co-browse ID may be stored in association with the customer session ID in session 220B or in another data structure accessible by server 220. Thus, given the customer session ID, co-browse servlet 230 is able to ascertain the co-browse ID for the customer's co-browsing session. Co-browse servlet 230 then locates table 230B corresponding to co-browse ID 101 and updates it to record the browser change.

Using the customer session ID included in the message, co-browse servlet 230 also identifies the server instance ID for server 250. As described above, the server instance ID (csrwebs1) for server 250 may be stored in association with the customer session ID in session 220B or in another data structure accessible by server 220. Thus, given the customer session ID, co-browse servlet 230 is able to ascertain the server instance ID for server 250.

In step 630, co-browse servlet 230 sends a message to server 250 (more specifically, to co-browse servlet 260), as identified by the server instance ID, notifying server 250 of the browser change in customer browser 210A. This message includes a notification of the browser change or event within browser 210A and the co-browse ID. Servlet 260 receives this message and locates and updates table 260B accordingly to reflect the change in browser 210A.

Periodically, CSR web browser 240A makes requests for updates on co-browsed information. Such requests include the CSR session ID. In step 640, an update request is sent to co-browse servlet 260. In an exemplary embodiment, the request takes the form of an AJAX "GetChange" request and is placed every half second.

Using the CSR's session ID embedded within the request, servlet 260 determines the co-browse ID (co-browse ID 101) associated with the CSR using means analogous to those described above with respect to servlet 230. Co-browse servlet 260 then locates table 260B corresponding to co-browse ID 101. If table 260B reflects a change in customer browser 210A, co-browse servlet 260 notifies CSR browser 240A of the browser change. CSR browser 240A then updates to display the change. In an exemplary embodiment, CSR browser 240A highlights the change to draw the CSR's attention to it.

Once CSR browser 240A has been updated, the customer and the CSR, more particularly customer browser 210A and CSR browser 240A, are synchronized.

Although the foregoing describes how system 200 tracks browser changes in customer browser 210A to synchronize CSR browser 240A with customer browser 210A, method 600 is applicable to track browser changes within CSR browser 240A to synchronize customer browser 210A with CSR browser 240A. Both such synchronizations may be performed simultaneously. Conflicts are resolved by synchronizing to the last browser change received by system 200.

To track browser changes within CSR browser 240A:

(1) CSR browser 240A experiences a browser change or event and notifies co-browse servlet 260;

(2) Co-browse servlet 260 updates table 260B to reflect such change and notifies co-browse servlet 230 of the change;

(3) Co-browse servlet 230 updates table 230B to reflect such change; and (4) Periodically, in a step analogous to step 640, customer browser 210A requests updates on browser changes and co-browse servlet 230 provides notification of such changes.

URL Synchronization

Figure 7:
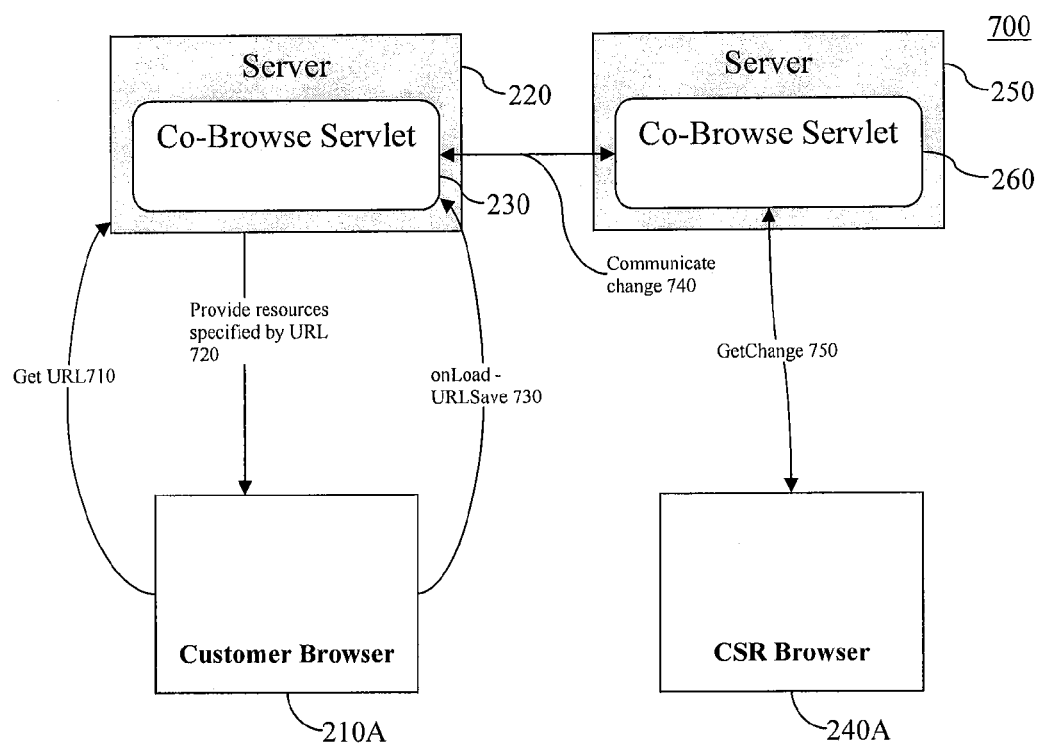
FIG. 7 illustrates a method of synchronizing URLs accessed by collaborating web browsers, in accordance with an embodiment of the present invention.

FIG. 7 illustrates a method 700 of synchronizing the URLs that are accessed by, or the web pages that are viewed by, the customer and the CSR who are operating, respectively, browser instances 210A and 240A. Method 700 presumes that the customer and CSR have registered for a co-browsing session identified as co-browse ID 101 illustrated in FIG. 2C.

URL or web-page synchronization is performed when, for example, the customer and the CSR are accessing (or have accessed) different URLs, in which case they may be accessing different resources specified by such URLs. URL or web-page synchronization is also performed when one of the one or more co-browsing users, who are accessing the same URL, selects another URL for access to associated resources (or, more specifically, selects another web page to view). Method 700 describes steps to achieve URL or web-page synchronization under either of these above-mentioned scenarios so that co-browsing users have access to identical, nearly identical, or related URLs or web pages. It is understood, however, that method 700 is not limited to use under only these two above-mentioned scenarios; method 700 may be used to synchronize URLs or web pages in other appropriate circumstances.

Method 700 begins with a step 710 in which customer browser 210A makes a call to server 220 to load a requested web page (or retrieve resources specified by a URL). Customer browser 210A may place such request under direction of the customer, such as when the customer clicks on a hyperlink in browser 210A, enters a URL in the address bar in browser 210A, etc. In an exemplary embodiment, the call is an HTTP-formatted "Get URL" request, e.g., an HTTP GET request. Server 220 receives the request and, in step 720, provides customer browser 210A with the resources (web page) associated with the URL identified in the request. Customer browser 210A processes the resources as applicable. In the exemplary embodiment in which the resources include a web page, browser 210A then renders the web page. In step 730, customer browser 210A sends a notification of the newly loaded URL to server 220, specifically to co-browse servlet 230, along with the customer session ID.

As described above, the web pages of website 220A rendered within customer browser 210A include embedded software code and/or script. In an exemplary embodiment, the embedded software code and/or script includes one or more event handlers that identify or capture events triggered by the browser's loading of web pages. Thus, as a result of the event triggered in step 720, an event handler sends a notification of the newly loaded URL to co-browse servlet 230 in step 730.

In the exemplary embodiment in which the web pages of website 220A include embedded JavaScript, included in this JavaScript is an event handler (the onLoad event handler) that is interpreted when the URL change event of customer browser 210A is triggered by the loading of a web page. This event handler causes browser 210A to send a message, in step 730, to co-browse servlet 230 notifying the servlet of the newly loaded URL. This message includes the customer session ID and may take the form of a "URLSave" AJAX request.

Continuing in FIG. 7, co-browse servlet 230 receives the notification of the URL change and, using the customer's session ID included in the message, determines the co-browse ID (co-browse ID 101) associated with the customer. Co-browse servlet 230 then locates table 230B corresponding to co-browse ID 101 and updates the URL stored therein.

Using the customer session ID included in the message, co-browse servlet 230 also identifies the server instance ID for server 250. In step 740, co-browse servlet 230 sends a message to server 250 (more specifically, to co-browse servlet 260), as identified by the server instance ID, notifying server 250 of the URL change in customer browser 210A. This message includes the URL served by server 220 and the co-browse ID. Servlet 260 receives this message and locates and updates table 260B accordingly to reflect the changed URL in browser 210A.

Periodically, CSR web browser 240A makes requests for updates on the current, co-browsed URL. Such requests include the CSR session ID. In step 750, an update request is sent to co-browse servlet 260. In an exemplary embodiment, the request take the form of an AJAX "GetChange" request and is placed every half second.

Using the CSR's session ID embedded within the request, servlet 260 determines the co-browse ID (co-browse ID 101) associated with the CSR using means analogous to those previously described. Co-browse servlet 260 then locates table 260B corresponding to co-browse ID 101. If table 260B reflects a change in the URL, which would indicate that the customer has browsed to a new URL, co-browse servlet 260 notifies CSR browser 240A which then requests the URL from server 220.

Once the new URL is loaded by CSR browser 240A, the customer and the CSR, more particularly customer browser 210A and CSR browser 240A, are URL or web-page synchronized.

Although the foregoing describes how system 200 tracks URL changes in customer browser 210A to synchronize CSR browser 240A with customer browser 210A, method 700 is applicable to track URL changes within CSR browser 240A to synchronize customer browser 210A with CSR browser 240A. Both such synchronizations may be performed simultaneously. Conflicts are resolved by synchronizing to the last URL or web-page change received by system 200.

To track URL (or web-page) changes within CSR browser 240A:

(1) CSR browser makes a request to server 250 to retrieve resources (e.g., a web page) specified by a URL;

(2) Server 250 provides CSR browser 240A with the resources (web page) associated with the URL requested by CSR browser 240A;

(3) Upon loading the requested resources (web page), CSR browser 240A sends a message to co-browse servlet 260 notifying co-browse servlet 260 of the newly loaded URL;

(4) Co-browse servlet 260 updates table 260B to reflect such change and notifies co-browse servlet 230 of the changed URL in CSR browser 240A;

(5) Co-browse servlet 230 updates table 230B to reflect such change; and (6) Periodically, customer browser 210A requests updates on the current, co-browsed URL from co-browse servlet 230, and co-browse servlet 230 provides such information which results in customer browser 210A requesting such URL.

Data Synchronization

Figure 8:
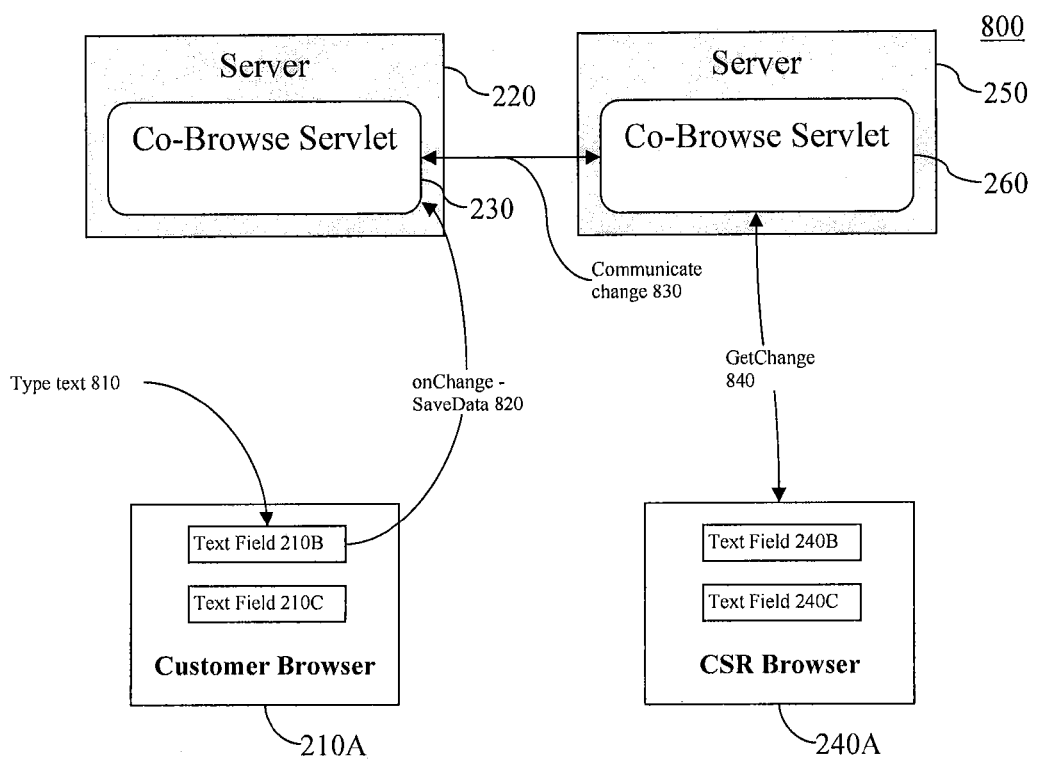
FIG. 8 illustrates a method of synchronizing data between collaborating web browsers, in accordance with an embodiment of the present invention.

FIG. 8 illustrates a method 800 of synchronizing data displayed on web pages rendered from identical (or similar or related) URLs viewed by the customer and CSR during co-browsing. As described above, a web page may include one or more fields for receiving user inputs. Such fields may include text boxes, radio buttons, drop-down lists, etc. Data synchronizing is concerned with communicating user-entered or user-selected data to co-browsing users. Method 800 presumes that the customer and the CSR have registered for a co-browsing session identified as co-browse ID 101 illustrated in FIG. 2C. Additionally, as method 800 assumes that the customer and CSR are viewing identical (or similar or related) URLs (or web pages), it is understood that the steps of method 700 have been and will continue to be executed.

As illustrated in FIG. 8, customer browser 210A includes two text fields, a text field 210B and a text field 210C. CSR browser 240A also includes two text fields, a text field 240B and a text field 240C. Text field 210B corresponds to text field 240B, and text field 210C corresponds to text field 240C. It is understood that these fields may receive and display any alphanumeric textual information. It is also understood that these fields may receive their entries or selections other than through user action, such as, for example, by another program, script, etc.

Method 800 begins with a step 810 in which customer browser 210A receives alphanumeric text in field 210B. The change in the text in field 210B triggers a data change event that is identified or captured by browser 210A. In an exemplary embodiment, the alphanumeric text is typed into field 210B by the customer, and the customer's tabbing out of field 210B triggers the data change event. In step 820, customer browser 210A sends a notification of the data change to server 220, specifically to co-browse servlet 230. Such notification includes a Tag which specifies field 210B, a Value which represents the alphanumeric string entered into field 210B, and the customer session ID associated.

As described above, the web pages of website 220A rendered within customer browser 210A include embedded software code and/or script. In an exemplary embodiment, the embedded software code and/or script includes one or more event handlers that identify or capture events triggered by the browser's loading of web pages. Thus, as a result of the event triggered in step 810, an event handler sends a notification of the changed data to co-browse servlet 230 in step 820.

In the exemplary embodiment in which the web pages of website 220A include embedded JavaScript, included in this JavaScript is an event handler (the onChange event handler) that is interpreted when the data change event of customer browser 210A is triggered by the customer tabbing out of text field 210B. This event handler causes customer browser 210A to send a message, in step 820, to co-browse servlet 230 notifying the servlet of the new data. This message includes the customer session ID and the Tag/Value pair corresponding to text field 210B and may take the form of a "SaveData" AJAX request.

Continuing in FIG. 8, co-browse servlet 230 receives the notification of the data change and, using the customer's session ID included in the message, determines the co-browse ID (co-browse ID 101) associated with the customer. Co-browse servlet 230 then locates table 230B corresponding to co-browse ID 101 and updates the Value of the Tag in table 230B according to the corresponding to the Tag/Value pair received in the notification.

Using the customer session ID included in the message, co-browse servlet 230 also identifies the server instance ID for server 250. In step 830, co-browse servlet 230 sends a message to server 250 (more specifically, to co-browse servlet 260), as identified by the server instance ID, notifying server 250 of the data change in browser 210A. This message includes the Tag which specifies field 210B, the Value which represents the alphanumeric string entered into field 210B, and the co-browse ID. Servlet 260 receives this message and locates and updates table 260B accordingly to reflect the change in data in browser 210A.

Periodically, CSR web browser 240A makes requests for updates on the co-browsed data. Such requests include the CSR session ID. In step 840, an update request is sent to co-browse servlet 260. In an exemplary embodiment, the request takes the form of an AJAX "GetChange" request and is placed every half second.

Using the CSR's session ID embedded within the request, servlet 260 determines the co-browse ID (co-browse ID 101) associated with the CSR using means analogous to those previously described. Co-browse servlet 260 then locates table 260B corresponding to co-browse ID 101. If table 260B reflects a change in a Tag/Value pair, which would indicate that the customer has changed data in customer browser 210A, co-browse servlet 260 notifies CSR browser 240A of the changed data in step 840. CSR browser 210A then updates to display the changed data. In an exemplary embodiment, CSR browser 240A highlights the data to indicate that it has changed.

Once CSR browser 240A has been updated, the customer and the CSR, more particularly customer browser 210A and CSR browser 240A, are data synchronized.

Although the foregoing describes how system 200 tracks data changes in customer browser 210A to synchronize CSR browser 240A with customer browser 210A, method 800 is applicable to track data changes within CSR browser 240A to synchronize customer browser 210A with CSR browser 240A. Both such synchronizations may be performed simultaneously. Conflicts are resolved by synchronizing to the last data change received by system 200.

To track data changes within CSR browser 240A:

(1) CSR browser 240A receives a data input and notifies co-browse servlet 260 of the data change;

(2) Co-browse servlet 260 updates table 260B to reflect such change and notifies co-browse servlet 230 of the changed data in CSR browser 240A;

(3) Co-browse servlet 230 updates table 230B to reflect such change; and (4) Periodically, customer browser 210A requests updates on the current, co-browsed data from co-browse servlet 230, and co-browse servlet 230 provides such information to customer browser 210A for display therein.

It should be noted that for any number of reasons, including security and liability in a financial application, certain functional limitations on data entry may be placed on one or the other of the browsers. For example, in a financial application in which the customer may be able to submit instructions using the customer browser 210A to cause purchase or sale of shares in securities, or otherwise change data associated with his or her account, it may be desirable to create rules that prevent the CSR from being able to perform such functions, even during collaboration. Thus, while CSR browser 240A may be able to see data entered by the customer with respect to certain fields, including highlighting of buttons that cause certain instructions, CSR 240A browser or the collaboration manager may have incorporated within it internal software rules that prevent the CSR from entering such data or instructions himself. It may further be desirable for other functions to be capable of initiation only by the CSR and for the customer to be similarly limited in functionality. Typically, regardless of specific application, such limitations are non-navigational in nature, meaning that both the customer and CSR typically have full capability of navigating through each of the pages of a website or through one or more websites, but may not have the ability to make certain types of data entry or submission of instructions.

Mouse and Scroll Bar Synchronization

Figure 9:
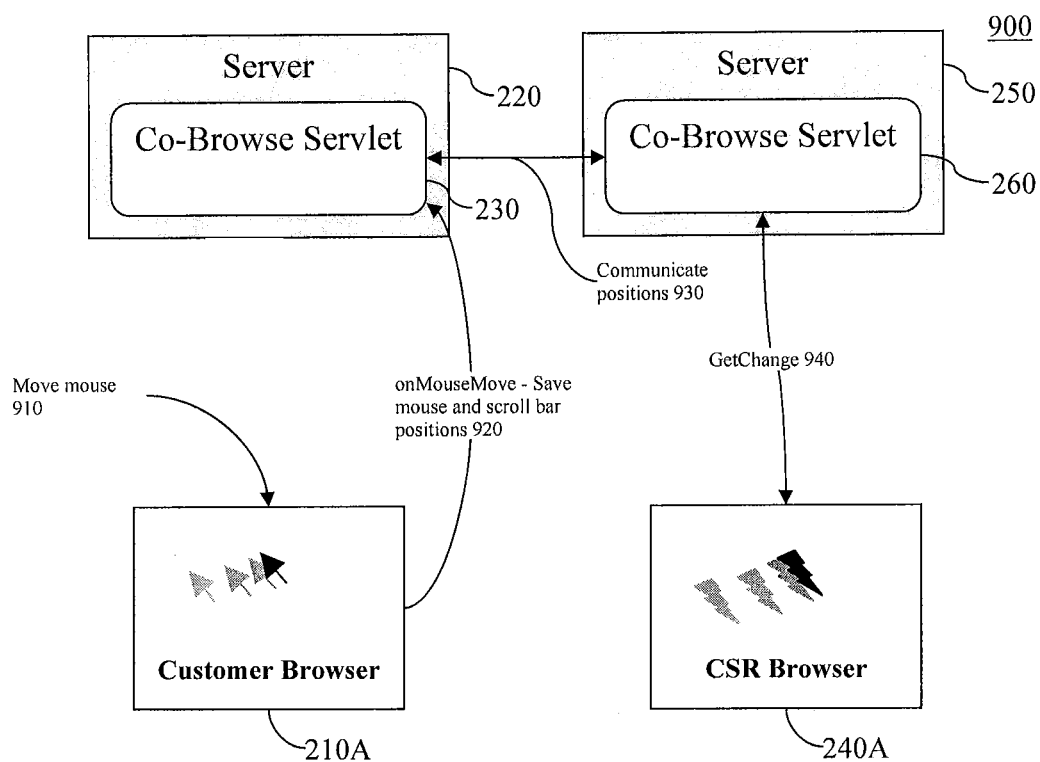
FIG. 9 illustrates a method of synchronizing mouse and scroll-bar positions between collaborating web browsers, in accordance with an embodiment of the present invention.

FIG. 9 illustrates a method 900 of synchronizing cursor positions and scroll-bar positions of the customer and CSR during co-browsing. As described above, a subset of data synchronization is cursor-position synchronization and scroll-bar synchronization. Method 900 presumes that the customer and the CSR have registered for a co-browsing session identified as co-browse ID 101 illustrated in FIG. 2C. Additionally, as method 900 assumes that the customer and CSR are viewing identical (or similar or related) URLs (or web pages), it is understood that the steps of method 700 have been and will continue to be executed.

Although not illustrated above in FIGS. 2A and 2B, each of customer computer 210 and CSR computer 240 includes a cursor controller (or similar or analogous device) for controlling the cursor of each user displayed in each user's computer and browser. Likewise, each of customer computer 210 and CSR computer 240 includes one or more scroll-bar controllers for controlling one or more scroll bars in each user's computer and browser. Method 900 describes steps by which an avatar in one computer is synchronized to a cursor controller of another computer and steps by which the scroll-bar controllers for co-browsing computers are synchronized.

In another exemplary embodiment, each of customer browser 210A and CSR browser 240A includes a cursor controller (or similar or analogous device) for controlling the cursor of each user displayed in each user's browser. Likewise, each of customer browser 210A and CSR browser 240A includes one or more scroll-bar controllers for controlling one or more scroll bars in each user's browser. Method 900 is applicable, with appropriate modifications, to synchronizing an avatar in one browser with a cursor controller of another computer's browser and to synchronizing the scroll-bar controllers of co-browsing computers' browsers.

Method 900 begins with a step 910 in which the customer operating customer browser 210A moves his cursor. Prior to moving the cursor, the customer may have also adjusted, i.e., moved, one or more scroll bars of customer browser 210A. The moving of the cursor triggers a cursor-move event. In step 920, customer browser 210A sends a notification of the cursor movement to server 220, specifically to co-browse servlet 230 as a result of the event. Such notification includes the position of the customer's cursor as well as positions of any scroll bars displayed within customer browser 210A. In an exemplary embodiment, customer browser 210A does not send such notification for every cursor-move event received. Rather, customer browser 210A only sends such notifications every third of a second, or other predetermined time, over which cursor-move events are received.

As described above, the web pages of website 220A rendered within customer browser 210A include embedded software code and/or script. In an exemplary embodiment, the embedded software code and/or script includes one or more event handlers that identify or capture events triggered by the browser's loading of web pages. Thus, as a result of the event triggered in step 910, an event handler sends a notification of the change in the cursor position as well as information on the position of one or more scroll bars displayed in customer browser 210A to co-browse servlet 230 in step 920. The notification takes the form of a message that includes the customer's session ID and a plurality of Tag/Value pairs, one of which corresponds to the cursor and one or more of which correspond to the one or more scroll bars within customer browser 210A.

In the exemplary embodiment in which the web pages of website 220A include embedded JavaScript, included in this JavaScript is an event handler (the onMouseMove event handler) that is interpreted when the cursor-movement event of customer browser 210A is triggered by the customer moving the cursor. This event handler causes customer browser 210A to send a message, in step 920, to co-browse servlet 230 notifying the servlet of the cursor's position as well as the positions of any scroll bars displayed within customer browser 210A. This message includes the customer session ID and the Tag/Value pairs of the cursor and any scroll bars and may take the form of a "SaveData" AJAX request.

Continuing in FIG. 9, co-browse servlet 230 receives the notification of the position changes and, using the customer's session ID included in the message, determines the co-browse ID (co-browse ID 101) associated with the customer. Co-browse servlet 230 then locates table 230B corresponding to co-browse ID 101 and updates the appropriate Tag/Value pairs to reflect the changes in the positions of the cursor and the one or more scroll bars.

Using the customer session ID included in the message, co-browse servlet 230 also identifies the server instance ID for server 250. In step 930, co-browse servlet 230 sends a message to server 250 (more specifically, to co-browse servlet 260), as identified by the server instance ID, notifying server 250 of the position changes in browser 210A. This message includes the Tags which specify the cursor and the one or more scroll bars, the positions of these items, and the co-browse ID. Servlet 260 receives this message and updates table 260B accordingly to reflect the change in browser 210A.

Periodically, CSR web browser 240A makes requests for updates on the positions of the customer's cursor and the positions of one or more scroll bars in the co-browse session. Such requests include the CSR's session ID. In step 940, an update request is sent to co-browse servlet 260. In an exemplary embodiment, the request takes the form of the AJAX "GetChange" request and is placed every half second.

Using the CSR's session ID embedded within the request, servlet 260 determines the co-browse ID (co-browse ID 101) associated with the CSR using means analogous to those previously described. Co-browse servlet 260 then locates table 260B corresponding to co-browse ID 101. If table 260B reflects a change in the position of the customer's cursor or cursor icon or the positions of the one or more scroll bars, which would indicate that the customer has moved his cursor or has adjusted the positions of one or more of the scroll bars, co-browse servlet 260 notifies CSR browser 240A of the new positions in step 940.

CSR browser 240A displays the position of the customer's cursor as an avatar separate from the CSR's cursor. The position of this avatar is dependent on the information received in step 940. Thus, the CSR is able to view the CSR's cursor and the customer's cursor avatar simultaneously, and as the customer moves his cursor, the avatar of this cursor correspondingly moves within CSR browser 240A. In FIG. 9, the avatar displayed in CSR browser 240A as representative of the customer's cursor is depicted as a lightning bolt.

CSR browser 240A also updates the position of one or more scroll bars displayed within CSR browser 240A depending upon the notification received from co-browse servlet 260 in step 940. Thus, as the customer scrolls within customer browser 210A, the CSR's browser 240A updates to reflect such scrolling. The combination of being able to view an avatar representing the position of the customer's cursor and to have CSR browser 240A scroll as the customer scrolls within customer browser 210A allows the CSR to view the customer's movements within a web page.

Once CSR browser 240A has been updated, the customer and the CSR, more particularly customer browser 210A and CSR browser 240A, are data synchronized.

Although the foregoing describes how system 200 tracks cursor and scroll-bar movements originating within customer browser 210A to synchronize CSR browser 240A with customer browser 210A, method 900 is applicable to track cursor and scroll-bar movements within CSR browser 240A to synchronize customer browser 210A with CSR browser 240A. Both such synchronizations may be performed simultaneously.

To track cursor movements and scroll-bar positions within CSR browser 240A:

(1) The CSR moves the position of his cursor and/or adjusts the position of one or more scroll bars within CSR browser 240A;

(2) Upon detecting a cursor-move event, CSR browser 240A notifies co-browse servlet 260 of the positions of the CSR's cursor and of the one or more scroll bars;

(3) Co-browse servlet 260 updates table 260B to reflect such positions and notifies co-browse servlet 230 of the changed positions in CSR browser 240A;

(4) Co-browse servlet 230 updates table 230B to reflect such changes; and (5) Periodically, customer browser 210A requests, from co-browse servlet 230, updates on the CSR's cursor's position and scroll-bar positions, and co-browse servlet provides such information to customer browser 210A for display therein.

Deregistration

Figure 10:
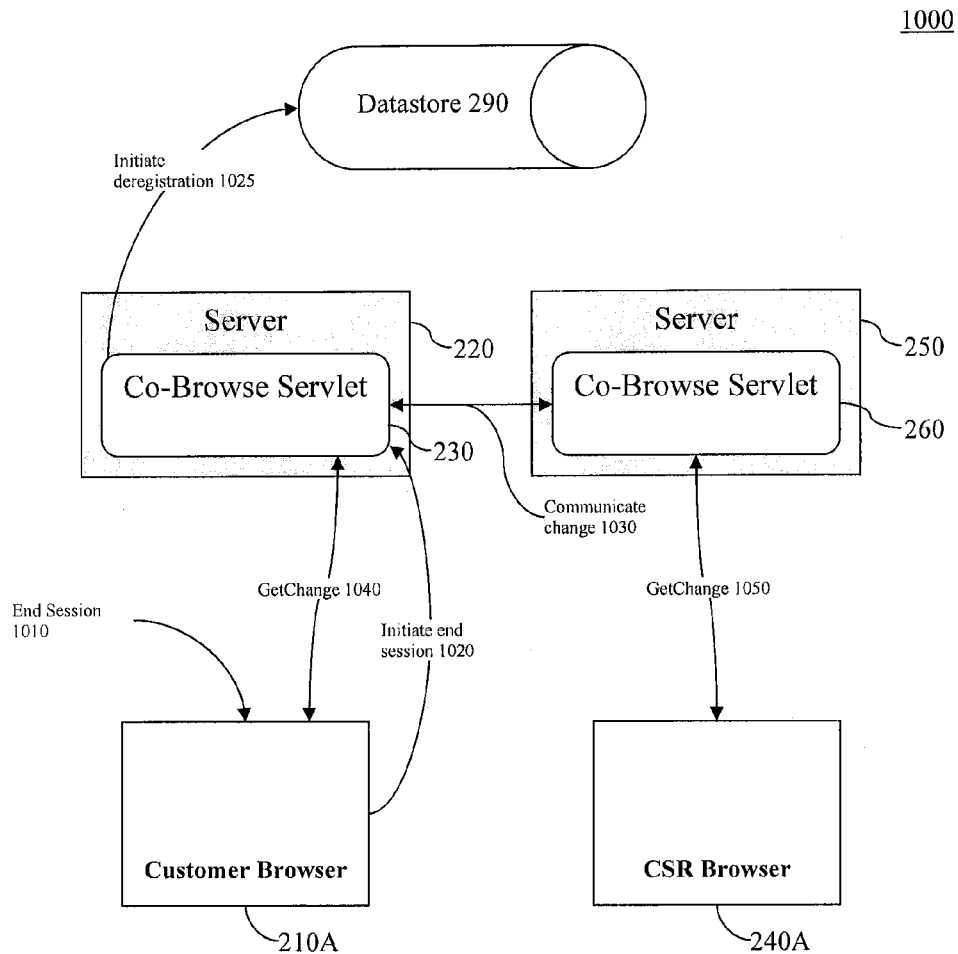
FIG. 10 illustrates a method of de-registering co-browsing web sessions, in accordance with an embodiment of the present invention.

Referring now to FIG. 10, there is illustrated a method 1000 of deregistering the customer and the CSR from co-browsing. In step 1010, the customer makes a request to end co-browsing. The request is sent to co-browse servlet 230 in step 1020. In an exemplary embodiment, it is sent as a "NoCoBrowse" AJAX request.

After receiving the request to end co-browsing, in step 1025, co-browse servlet 230 removes the customer's registration from datastore 290 or changes such registration to "inactive." In step 1030, co-browse servlet 230 informs co-browse servlet 260 of the deregistration of the customer.

As customer browser 210A and CSR browser 240A send their periodic "GetChange" requests to respective co-browse servlets 230 and 260 in respective steps 1040 and 1050, they are informed of the deregistration of the customer from co-browsing. Thus, customer browser 210A and CSR browser 240A cease their periodic requests for updates from the co-browse servlets and update their displays to indicate that co-browsing is no longer being performed. The collaboration manager for collaboration between the customer and the CSR is thereby terminated.

The foregoing discussion describes a process by which the customer initiates the deregistration procedure. It is understood that method 1000 is applicable, with appropriate modifications, to deregistration initiated by the CSR.

Although the invention is illustrated and described herein with reference to specific embodiments, the invention is not intended to be limited to the details shown. Rather, various modifications may be made in the details within the scope and range of equivalents of the claims and without departing from the invention.

For example, although the foregoing describes co-browsing between a customer and a CSR, the system and methods described herein are applicable, with appropriate modification, to co-browsing among three or more users. In such circumstances, datastore 290, and particularly each entry within datastore 290, is capable of tracking the IDs for the three or more users. Each of the three or more users registers using procedures similar to those described above with respect to FIGS. 3-5, and each of the three or more users synchronizes URLs (web pages), data, mouse-cursor positions, and scroll-bar positions using methods similar to those described with relation to FIGS. 6-9. It is understood that in such embodiments, because there are three or more users, there may be three or more servers (or application servers and web servers). Accordingly, informing the servers of changes in the browsers may require a greater number of messages along communications pathway 280 as a change in one browser communicated to one server should be communicated to the other two or more application servers.

Additionally, although much of the foregoing describes co-browsing of web pages between a customer and a CSR, the system and methods described herein are applicable to co-browsing of any resources provided over one or more networks. Thus, the foregoing description relating to URL synchronization or web-page synchronization is applicable to synchronizing access to network resources by co-browsing users, and the foregoing description relating to data synchronizing is applicable to synchronizing data contained in such network resources. In exemplary embodiments, such network resources contain software code and/or script which directs the communications between the co-browsing users and the network and vice versa.

What is claimed:

1. A method for collaborative internet browsing by a first user associated with a first computer comprising a first display and a first browser comprising a first open browser instance, and a second user associated with a second computer comprising a second display and a second browser comprising a second open browser instance, the method comprising the steps of:

providing a website accessible by the first and second browsers, the website comprising one or more web pages, each web page corresponding to a web address;

establishing a first connection between the first computer and the website comprising a first session having a first identifier and causing a web page to load in the first browser instance;

establishing a second connection between the second computer and the website comprising a second session having a second identifier different from the first identifier and causing a web page to load in the second browser instance;

establishing an association between the first identifier and the second identifier and generating a co-browse identifier;

without requiring installation or downloading of any collaboration-enabling executable software program by either the first or second computer or requiring use of an additional browser instance or frame to transmit or receive changes in the first or second browser instances, establishing a collaboration manager that associates the first and second browser instances and communicates changes or events originating in the first browser instance to the second browser instance;

causing the second browser instance to notify the collaboration manager of changes or events originating in the second browser instance;

causing the first browser instance to communicate with the collaboration manager in order to receive changes or events originating in the second browser instance; and causing the first browser instance to synchronize to the second browser instance to mirror the changes or events originating in the second browser instance.

2. The method of claim 1, further comprising:
causing the first browser instance to notify the collaboration manager of changes or events originating in the first browser instance;
causing the second browser instance to communicate with the collaboration manager in order to receive changes or events originating in the first browser instance; and
causing the second browser instance to synchronize to the first browser instance to mirror the changes or events originating in the first browser instance, wherein
the collaboration manager communicates changes or events originating in the second browser instance to the first browser instance and changes or events originating in the first browser instance to the second browser instance.

3. The method of claim 1, wherein the website comprises a first set of web pages accessible to the first user and a second set of web pages accessible only to the second user, wherein one or more pages in the second set of web pages comprises at least a portion thereof that is identical in content to a corresponding page or pages in the first set of web pages.

4. The method of claim 3, wherein the one or more pages in the second set of web pages comprises additional content not provided in a corresponding page or pages in the first set of web pages.

5. The method of claim 4, further comprising providing data entered by the first user in the first browser instance among the additional content provided on the one or more web pages in the second set of web pages.

6. The method of claim 1, further comprising causing changed or added information in a web page rendered in the first browser instance to be highlighted whenever the information is changed or added in response to a communication received from the collaboration manager.

7. The method of claim 1, wherein the first computer comprises a first cursor controller for controlling a position of a first cursor relative to content on the first display, the second computer comprises a second cursor controller for controlling a position of a second cursor relative to content on the second display, the method further comprising generating a first cursor avatar on the first display for showing the position of the second cursor relative to the content on the second display.

8. The method of claim 1, further comprising storing data sufficient to provide a history of a user's use of the website.

9. The method of claim 1, further comprising:
prior to the step of establishing the collaboration manager, causing the first browser instance to display a query requesting authorization to create a collaborative browsing session;
receiving authorization to create the collaborative browsing session;
creating the collaborative browsing session by establishing the collaboration manager only after receiving the authorization; and
registering the first user or the first browser instance with the collaborative browsing session.

10. The method of claim 9, further comprising receiving a communication from the first user over a communication channel and using unique information about the first user provided via the communication channel to identify a collaborative browsing session for which the first user has registered from a list of registered collaborative browsing sessions.

11. The method of claim 1, further comprising storing a cache of the changes or events originating from the second browser instance prior to the step of establishing the collaboration manager, sharing at least a portion of the cache with the collaboration manager, once established, and the collaboration manager providing information to the first browser instance from the cache sufficient to enable the first browser instance to reflect browser changes or events originating in the second browser instance and stored in the cache before the collaboration manager was established.

12. The method of claim 11, wherein the portion of the cache shared with the collaboration manager and provided to the first browser instance is sufficient to enable the first browser instance to move backward and forward through a series of web pages corresponding to web pages visited by the second browser instance before the collaboration manager was established and to enable the first browser instance to display the changes or events originating in the second browser instance.

13. The method of claim 1, wherein the website comprises a plurality of identical website instances and wherein the first browser instance is connected to a first website instance and the second browser instance is connected to a second website instance.

14. The method of claim 1, further comprising preventing one or more predetermined functions to be performed by one of the first or second browser instances during a collaboration session.

15. The method of claim 14, wherein the one or more predetermined functions are non-navigational in nature.

16. The method of claim 1, wherein the one or more web pages include embedded software code that is interpreted by the first and second browser instances, that causes the second browser instance to notify the collaboration manager of the changes or events originating in the second browser instance, and that causes the first browser instance to request the collaboration manager to communicate to the first browser instance the changes or events originating in the second browser instance.

17. The method of claim 16, wherein the embedded software code includes a first event handler that requests the collaboration manager to communicate to the first browser instance the changes or events originating in the second browser instance and a second event handler that identifies or captures browser change events triggered by the changes originating in the second browser instance and communicates notifications of the changes originating in the second browser instance to the collaboration manager.

18. The method of claim 17, wherein the embedded software code includes script that causes periodic triggering of events that cause the first browser instance to execute the first event handler.

19. The method of claim 1, wherein:
the changes or events include changes in web addresses accessed by the second browser instance,
the step of causing the first browser instance to communicate with the collaboration manager comprises causing the first browser instance to communicate with the collaboration manager in order to receive changes in web addresses accessed by the second browser instance,
the step of causing the first browser instance to synchronize to the second browser instance comprises causing the first browser instance to access the web addresses accessed by the second browser instance, and the step of causing the second browser instance to notify the collaboration manager comprises causing the second browser instance to notify the collaboration manager of a change in a web address accessed by the second browser instance.

20. The method of claim 1, wherein:
the changes or events include changes in data displayed in the second browser instance,
the step of causing the first browser instance to communicate with the collaboration manager comprises causing the first browser instance to communicate with the collaboration manager in order to receive changes in data displayed in the second browser instance,
the step of causing the first browser instance to synchronize to the second browser instance comprises causing the first browser instance to display the data displayed in the second browser instance, and
the step of causing the second browser instance to notify the collaboration manager comprises causing the second browser instance to notify the collaboration manager of a change in data displayed in the second browser instance.

21. The method of claim 20, wherein the step of synchronizing the first browser instance with the second browser instance comprises mapping data from one or more data fields in a web page rendered within the first browser instance to data fields in a web page rendered within the second browser instance.

22. The method of claim 1, wherein:
the changes or events include changes in positions of scroll bars of the second browser instance,
the step of causing the first browser instance to communicate with the collaboration manager comprises causing the first browser instance to communicate with the collaboration manager in order to receive changes in a position of one or more scroll bars of the second browser instance,
the step of causing the first browser instance to synchronize to the second browser instance comprises causing the position of one or more scroll bars of the first browser instance to synchronize to the position of the one or more scroll bars of the second browser instance, and
the step of causing the second browser instance to notify the collaboration manager comprises causing the second browser instance to notify the collaboration manager of a change in the position of the one or more scroll bars of the second browser instance.

23. The method of claim 1, wherein the collaboration manager comprises first and second tables, the method further comprising:
storing the browser changes or events originating in the second browser instance in the second table, as a result of the notification of the changes or events originating in the second browser instance; and
communicating the browser changes or events originating in the second browser instance to the first table for storage therein.

24. The method of claim 1, wherein the association between the first identifier and the second identifier is established by a means for associating the identifiers.

25. The method of claim 24, wherein the means for associating the identifiers comprises a datastore.

26. A system for synchronizing data displayed on a first computer comprising a first processor, a first display, and a first browser instance, with data displayed on a second computer comprising a second processor, a second display, and a second browser instance, the system comprising:
a computer network;
means for establishing a first connection between the first computer and the computer network comprising a first session having a first identifier;
means for establishing a second connection between the second computer and the computer network comprising a second session having a second identifier different from the first identifier;
means for establishing a collaboration manager for associating the first identifier with the second identifier and generating a co-browse identifier, communicating to the first browser instance changes or events originating in the second browser instance and communicating to the second browser instance changes or events originating in the first browser instance, without requiring installation or downloading of any collaboration-enabling executable software program by either the first or second computer or requiring use of an additional browser instance or frame to transmit or receive changes in the first or second browser instances;
a plurality of web pages stored in memory media on the computer network and accessible by the first and second browser instances, each web page comprising a set of instructions tangibly embodied on the memory media, said instructions adapted to cause:
the first browser instance to notify the collaboration manager of changes or events originating in the first browser instance, to communicate with the collaboration manager in order to return changes or events originating in the second browser instance, and to synchronize the first browser instance to mirror the changes or events originating in the second browser instance; and
the second browser instance to notify the collaboration manager of changes or events originating in the second browser instance, to communicate with the collaboration manager in order to return changes or events originating in the first browser instance, and to synchronize the second browser instance to mirror the changes or events originating in the first browser instance.

27. A method for collaborative internet browsing by a first user associated with a first computer comprising a first display and a first browser comprising a first open browser instance connected to a first session having a first identifier, and a second user associated with a second computer comprising a second display and a second browser comprising a second open browser instance connected to a second session having a second identifier different from the first identifier, the method comprising the steps of:
receiving a web page of a website accessible by the first and second computers, the website comprising one or more web pages, each web page corresponding to an associated web address, the web page received by the first computer being served by a server;
loading the received web page in the first browser instance of the first computer;
sending a request to establish a collaboration session, the request causing a collaboration manager to be created that associates the first and second identifiers and generates a co-browse identifier, that communicates changes or events originating in the first browser instance to the second browser instance, and that communicates changes or events originating in the second browser instance to the first browser instance, the creation of the collaboration manager not requiring installation or downloading of any collaboration-enabling executable software program by the first computer or requiring use of an additional browser instance or frame by the first or second computers to transmit or receive browser changes or events;

notifying the collaboration manager of changes or events originating in the first browser instance, the notification causing the collaboration manager to report the changes or events to the second browser instance to synchronize the second browser instance to the first browser instance;

sending a request for notification from the collaboration manager of changes or events originating in the second browser instance, the request causing the collaboration manager to send notification of changes or events originating in the second browser instance to the first computer;

receiving a notification of changes or events originating in the second browser instance from the collaboration manager; and synchronizing the first browser instance to the second browser instance.

28. A method for synchronizing uniform resource locators (URLs) accessed by a first user associated with a first computer a first display and a first browser comprising a first open browser instance and a first embedded software script and a second user associated with a second computer comprising a second display and a second browser comprising a second open browser instance and a second embedded software script, the method comprising:

establishing a first connection between the first computer and a computer network in a first session having a first identifier, the computer network comprising a plurality of URLs accessible by connected users, each URL being associated with one or more resources;

establishing a second connection between the second computer and the computer network in a second session having a second identifier different from the first identifier;

receiving from the first computer a first request comprising a request to access a first URL;

providing resources specified by the first URL to the first computer;

associating the first identifier with the second identifier, by a means for associating the identifiers, and generating a co-browse identifier;

without requiring installation or downloading of any collaboration-enabling executable software program by either the first or second computer or requiring use of an additional browser instance or frame to transmit or receive changes in the first or second browser instances, causing the first embedded software script to provide a notification of receipt of the resources as a result of the first computer receiving the resources specified by the first URL;

receiving by the second embedded software script of the second computer the notification of the receipt of the resources by the first computer; and as a result of receiving the notification from the first computer, providing resources specified by the first URL to the second computer.

29. The method of claim 28, wherein the providing of the resources specified by the first URL to the second computer comprises:

providing notification of the first URL to the second computer;

causing the second computer to send a request comprising a second URL as a result of the second computer receiving the notification of the first URL;

receiving the request from the second computer; and as a result of receiving the request from the second computer, providing the resources specified by the second URL to the second computer.

30. The method of claim 29, wherein the first URL is related to the second URL.

31. The method of claim 29, wherein the first URL is the same as the second URL.

32. The method of claim 29, further comprising:

receiving from the second computer a request comprising an initial URL prior to the providing of the notification of the first URL to the second computer;

providing to the second computer resources specified by the initial URL;

causing the second computer to provide a notification of the receipt of the resources specified by the initial URL as a result of the second computer receiving the resources specified by the initial URL; and receiving the notification of the receipt of the resources specified by the initial URL, wherein the resources provided to the second computer and specified by the initial URL comprise embedded software code that causes the second computer to request notification of the URL accessed by the first computer.

33. The method of claim 32, wherein the resources provided to the first computer and specified by the first URL comprise embedded software code that causes the first computer to provide the notification of the receipt of the resources by the first computer, and wherein the resources provided to the second computer and specified by the second URL comprise embedded software code that causes the second computer to provide the notification of the receipt of the resources by the second computer.

34. The method of claim 28, wherein the means for associating the identifiers comprises a datastore.

35. A method for synchronizing data displayed on a first computer having a first display and a first browser comprising a first open browser instance with data displayed on a second computer having a second display and a second browser comprising a second open browser instance, the method comprising:

establishing a first connection between the first computer and a computer network in a first session having a first identifier, the computer network comprising a plurality of web pages accessible by connected users;

establishing a second connection between the second computer and a second computer network in a second session having a second identifier different from the first identifier;

receiving from the first computer a first request comprising a request to access a web page;

associating, by a datastore, the first identifier with the second identifier and generating a co-browse identifier;

without requiring installation or downloading of any collaboration-enabling executable software program by either the first or second computer or requiring the use of an additional browser instance or frame to transmit or receive changes in the first or second browser instances, providing the web page to the first computer, the web page comprising embedded software code that causes the first computer to provide a notification of a data change in the web page;

receiving the notification of the data change in the web page provided to the first computer; and providing notification of the data change to the second computer.

36. The method of claim 35, further comprising:

receiving from the second computer a request to access the web page;

providing the web page to the second computer, the web page comprising embedded software code that causes the second computer to request notification of a data change in the web page originating from the first computer; and receiving, from the second computer, a request for notification of a data change in the web page originating from the first computer, and providing notification of a data change in the web page of the first computer to the second computer as a result of receiving the request for notification from the second computer.

37. The method of claim 35, further comprising:

providing the web page to the second computer, the web page comprising embedded software code that causes the second computer to provide a notification of a data change in the web page provided to the second computer;

receiving, from the second computer, notification of a data change in the web page provided to the second computer; and providing notification of the data change originating from the second computer to the first computer.

* * * * *